US012754928B1

(12) United States Patent
Bradley et al.

(10) Patent No.: US 12,754,928 B1
(45) Date of Patent: Oct. 6, 2026

(54) GENERATING GENERATIVE RESPONSES FROM FORMATTED LOCAL DATA

(71) Applicant: Dropbox, Inc., San Francisco, CA (US)

(72) Inventors: Connor Bradley, Edmonton (CA); Jacob Gorm Hansen, Ryomgaard (DK); Jacob Solomon, Austin, TX (US); Raju Nagalinga, Woodinville, WA (US); Richard Chan, Flushing, NY (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/427,185

(22) Filed: Dec. 19, 2025

(51) Int. Cl.
*G06F 16/25* (2019.01)
*G06F 16/22* (2019.01)
*G06F 16/248* (2019.01)

(52) U.S. Cl.
CPC ............ *G06F 16/258* (2019.01); *G06F 16/22* (2019.01); *G06F 16/248* (2019.01)

(58) Field of Classification Search
CPC ....... G06F 16/258; G06F 16/248; G06F 16/22
USPC .......................................................... 707/722
See application file for complete search history.

(56) References Cited

U.S. PATENT DOCUMENTS 8,458,186 B2 6/2013 Stringham et al.
9,092,525 B2 7/2015 Nandakumar et al.
9,195,746 B2 11/2015 Tomko et al.
9,898,537 B2 2/2018 Leclerc et al.
10,402,432 B1 9/2019 Kirazci et al.
11,846,158 B2 12/2023 Zhao
12,386,839 B2 * 8/2025 Neill ..................... G06F 16/254
12,488,359 B2 * 12/2025 Martchenko ........... G06Q 30/02
2006/0031253 A1 2/2006 Newbold et al.
2010/0115003 A1 5/2010 Soules et al.
2011/0252038 A1 10/2011 Schmidt et al.
2016/0267170 A1 * 9/2016 Hastings ............... H04L 67/564
2020/0004759 A1 * 1/2020 Brebner ..................... G06F 8/10
2022/0215068 A1 7/2022 Kittur et al.

(Continued)

OTHER PUBLICATIONS

Spitznagel, Bridget, et al., "A Compositional Approach for Constructing Connectors", WICSA 2001, Amsterdam, The Netherlands, Aug. 28-31, 2001, pp. 148-157.*

(Continued)

*Primary Examiner* — Robert Stevens
(74) *Attorney, Agent, or Firm* — Keller Preece PLLC

(57) ABSTRACT

The present disclosure relates to systems, non-transitory computer-readable media, and methods for transforming unstructured data from an application running locally on a client device and indexing the data in a local index for use by a generative model. In particular, in one or more embodiments, the disclosed systems receive unstructured local data from an application running locally on a client device and transform the unstructured local data to formatted local data that matches a data format of a connector for the application. The disclosed systems index the formatted local data in a local index and access the formatted local data for use by a generative model to generate a generative response. In some embodiments, the disclosed systems generate additional contextual data from the application running locally on the client device and index the additional contextual data with the formatted local data for use by the generative model.

20 Claims, 15 Drawing Sheets

(56) References Cited

U.S. PATENT DOCUMENTS

| | | | | |
|---|---|---|---|---|
| 2024/0281472 | A1* | 8/2024 | LaRhette | G06F 16/24575 |
| 2025/0110975 | A1* | 4/2025 | Shea | G06F 16/3329 |
| 2025/0252122 | A1* | 8/2025 | Bhura | G06F 16/3347 |
| 2025/0258938 | A1* | 8/2025 | Palladino | G06F 21/6227 |
| 2025/0284688 | A1* | 9/2025 | Yakovlev | G06F 16/243 |
| 2025/0315308 | A1* | 10/2025 | Roh | G06F 9/5033 |
| 2025/0322145 | A1* | 10/2025 | Mann | G06F 16/33295 |
| 2025/0371052 | A1* | 12/2025 | Svenell | G06F 16/334 |
| 2025/0390506 | A1* | 12/2025 | Chalasani | G06F 16/27 |
| 2026/0017487 | A1* | 1/2026 | Goel | G06N 3/0442 |
| 2026/0127165 | A1* | 5/2026 | Sharma | G06F 16/243 |

OTHER PUBLICATIONS

Luera, Reuben, et al., "Survey of User Interface Design and Interaction Techniques in Generative AI Applications", arXiv, Cornell University Document archive, arXiv:2410.22370v1 [cs.HC] Oct. 28, 2024, pp. 1-42.*

Zhu-Tian, Chen, et al., "CrossData: Leveraging Text-Data Connections for Authoring Data Documents", CHI '22, New Orleans, LA, Apr. 29-May 5, 2022, 15 pages.*

Chen, Junqing, et al., "Supporting Dynamic Service Updates in Pervasive Applications", Compsac 2011, Munich, Germany, Jul. 18-22, 2011, pp. 273-278.*

* cited by examiner

GENERATING GENERATIVE RESPONSES FROM FORMATTED LOCAL DATA

BACKGROUND

Recent years have seen significant improvements in the use of generative models to synthesize responses by applying learned representations to interpret available information. For example, conventional systems can combine foundational model knowledge with application-specific data to generate text, summaries, recommendations, or other machine-generated content aligned with a user's current task or environment. Specifically, conventional systems use connectors or APIs to access application-specific data, then use a generative model to generate task- or environment-specific responses using that data. In many implementations, conventional systems rely on these structured integrations to obtain contextual application data and supply that information to the generative model, allowing the generative model to incorporate elements of the application's current state and enabling conventional systems to produce responses that reflect a user's ongoing activity, identify related content items, generate summaries or explanations of displayed material, surface recommendations relevant to the active task, and more. Despite these advances, however, conventional systems are often hamstrung by their reliance on connectors or APIs, leading to deficiencies and issues with generating output.

For example, conventional systems are inflexible because they rely on predefined connectors or integrations to access application data, limiting their ability to operate without an established connector or across diverse environments that connectors cannot span. More specifically, if a conventional system lacks a configured connector or a connector is unavailable or unsupported for a given application, the system is unable to retrieve the application data needed to synthesize output, resulting in a partial or complete loss of functionality for generating responses. This dependency limits the flexibility of conventional systems, as their functionality is effectively constrained to the set of applications for which compatible connectors exist and are correctly functioning. Further, conventional systems cannot adapt behavior or compensate for missing integrations, leaving entire portions of a user's computing environment inaccessible (e.g., where connector APIs provide access to only certain portions of an environment or stored data). Consequently, the system's functionality becomes tightly constrained to applications with established integrations, reducing its overall flexibility and preventing it from supporting a broader range of user workflows.

Due to their reliance on integrations with applications, conventional systems are also inaccurate as they are materially limited to the application data provided by an application. For example, third-party systems or applications often provide only a subset of application data or exclude particular elements of the application's operating state, such as information corresponding to user interactions with the application. In many cases, these models must rely solely on prior training knowledge or fragmentary contextual cues, which can result in speculative or generalized outputs. Consequently, the resulting generative output may reflect an incomplete or fragmented view of the information available within the application environment, which often includes missing meaningful information when generating output. Such limitations are further compounded when the model lacks visibility into dynamically changing application states or locally stored information, leading to inconsistencies and diminished reliability in the generated content.

Further, conventional systems are inefficient. For example, because conventional systems often operate without access to relevant application data or rely on indirect, incomplete, or delayed information, conventional systems often require additional computation to infer missing details, resulting in inefficient processing and increased resource consumption. In such configurations, conventional systems often receive repeated user queries that trigger redundant processing to regenerate responses. This inefficiency can manifest in conventional systems as longer response times, redundant model invocations, or repeated retrieval operations, all of which reduce overall system performance. As a result, the generation process for conventional systems may become slower, more resource-intensive, and less responsive to real-time user activity, limiting the practical effectiveness of these systems in dynamic environments.

SUMMARY

Embodiments of the present disclosure provide benefits and/or solve one or more of the foregoing or other problems in the art with systems, non-transitory computer-readable media, and methods for facilitating data access of application data to generative models without necessarily establishing integrated connectors with the applications. The disclosed systems can accomplish this by transforming a data format for unstructured data from an application on a client device and indexing the data in a local index for use by a generative model. For example, the disclosed systems receive unstructured data from an application running locally on a client device and transform the unstructured data into a format that matches a connector for the application and index the formatted data in a local index. The disclosed systems can further access the formatted data in the local index and utilize a generative model to synthesize a generative response that matches generative responses for the connector for the application. Further, the disclosed systems can display the generative response on the client device, within the application corresponding to the unstructured data or an additional application. Further, the disclosed systems can extract metadata corresponding to user interactions and/or content of the application on the client device and utilize the metadata to synthesize the generative response. Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

This disclosure describes one or more embodiments of a data transformation and response system that introduces a unique approach to surfacing application data to generative models (e.g., other than through connectors). In particular, the data transformation and response system can: 1) transform unstructured data from an application running locally on a client device to a data format of a connector for the application, and 2) index the data in a local index for use by a generative model. More specifically, the data transformation and response system can transform the unstructured data by structuring the data in a format that aligns with a data format of a connector for the application. The data transformation and response system can further store the formatted data in a local index associated with the client device. In some embodiments, the data transformation and response system accesses the formatted data in the local index and utilizes a generative model to generate a context-aware generative response from the formatted data that emulates a generative response for a connector of the application. Indeed, the data transformation and response system can generate a generative response that utilizes data from the application despite the absence of a connector to support application integration.

Figure 1:
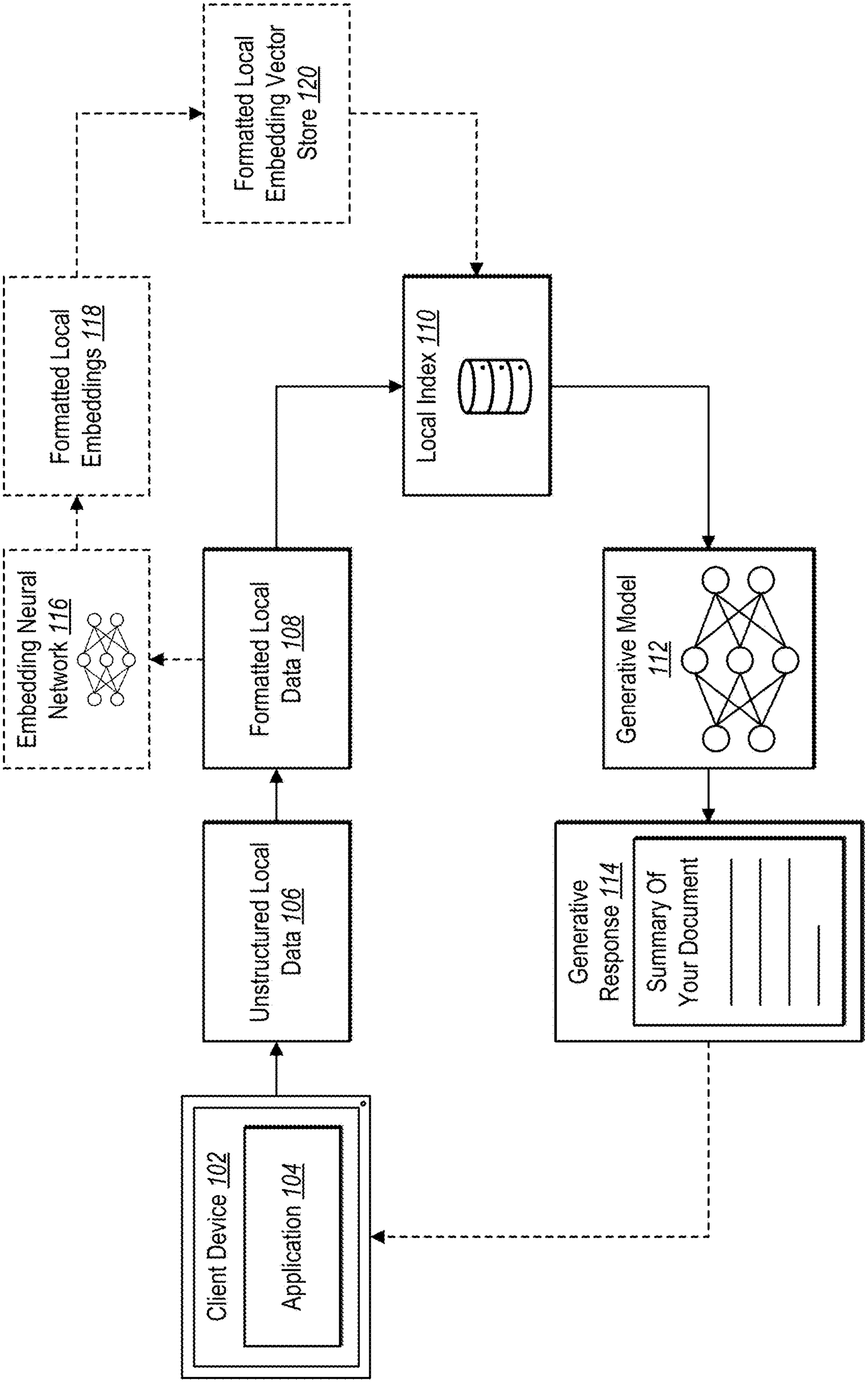
FIG. 1 illustrates an example diagram of an overview of a data transformation and response system transforming unstructured local data into formatted local data and using the formatted local data to generate a generative response in accordance with one or more embodiments.

FIG. 1 illustrates an example overview of data transformation and response system 100 transforming unstructured local data 106 to formatted local data 108 and accessing the formatted local data 108 in local index 110 to generate a generative response 114. Additional detail regarding the acts and processes introduced in relation to FIG. 1 is provided thereafter with reference to subsequent figures.

As shown in FIG. 1, the data transformation and response system 100 receives unstructured local data 106 from application 104 on client device 102. More particularly, the data transformation and response system 100 receives unstructured local data 106 that is generated from, stored by, or associated with the application 104 running locally on the client device 102. The data transformation and response system 100 then transforms the unstructured local data 106 to the formatted local data 108 by applying a data format for a connector for application 104 to the unstructured local data 106. Indeed, the data transformation and response system 100 converts the unstructured local data 106 to imitate connector-like data in a format otherwise compatible with a would-be connector that might otherwise connect the application 104 to the generative model 112 but that has not been established.

As also shown, in one or more embodiments, the data transformation and response system 100 indexes the formatted local data 108 in the local index 110 as formatted local embeddings 118 that are indexed within formatted local embedding vector store 120. More specifically, the data transformation and response system 100 utilizes embedding neural network 116 to generate formatted local embeddings 118 that encode the formatted local data 108 and index the formatted local embeddings 118 within the formatted local embedding vector store 120 that is associated with local index 110. For example, the data transformation and response system 100 utilizes the embedding neural network neural network 116 to encode data and formatting from formatted local data 108 and indexes the formatted local embeddings 118 within the formatted local embedding vector store 120 for downstream retrieval. Indeed, by storing the formatted local embeddings 118 within the formatted local embedding vector store 120, the data transformation and response system 100 can perform retrieval-augmented generation to generate the generative response 114.

In some embodiments, the data transformation and response system 100 can also generate metadata from the application 104 and index the metadata with the formatted local data 108 in the local index 110. For example, the data transformation and response system 100 can generate metadata from user interactions or content displayed within application 104 and can index the metadata with the formatted local data 108 in local index 110 for processing with the formatted local data 108 in downstream operations. In some cases, the data transformation and response system 100 indexes the metadata with the formatted local embeddings 118 within the formatted local embedding vector store 120. Additional details regarding the data transformation and response system 100 transforming unstructured local data 106 to formatted local data 108 and indexing the formatted local data 108 (and metadata) within local index 110 are provided below with respect to FIG. 2.

As also shown, in one or more embodiments, the data transformation and response system 100 accesses the formatted local data 108 in the local index 110 and utilizes a generative model 112 to generate a generative response 114. In particular, the data transformation and response system 100 is part of a content management system that comprises (or accesses) a generative model 112 to synthesize generative responses corresponding to content items executing locally on applications and stored content items. The data transformation and response system 100 generates the generative response 114 by utilizing a generative model 112 associated with a content management system to synthesize a response, such as a suggested action, a contextual insight, a summary, or suggested content (e.g., suggested content items), from the formatted local data 108 indexed in the local index 110. Further, the data transformation and response system 100 generates the generative response 114 to mirror a generative response that the content management system could generate using a connector with the application 104 when a connector is not configured between the application 104 and the content management system to generate generative responses.

The data transformation and response system 100 provides the generative response 114 for display via the client device 102. More specifically, the data transformation and response system 100 can provide the generative response 114 via multiple different applications on the client device 102. For example, in some cases, the data transformation and response system 100 provides the generative response 114 within the application 104 (e.g., client application 716, as discussed in FIG. 7) or another application associated with the content management system. In other cases, the data transformation and response system 100 provides the generative response 114 within a third-party application that is associated with the content management system. Additional details regarding the data transformation and response system 100 generating a generative response and providing the response via an application of a client device are provided below with respect to FIG. 3.

The data transformation and response system 100 can provide the generative response 114 within various applications. For instance, the data transformation and response system 100 can provide the generative response 114 within a third-party application associated with the content management system or an application associated with the content management system. Additional details and example graphical user interfaces of the data transformation and response system 100 receiving user input and generating a corresponding generative response in a third-party application are provided below with respect to FIGS. 5A-5C.

As previously mentioned, in one or more embodiments, the data transformation and response system 100 generates the generative response 114 that emulates a generative response for a connector with the application 104, even when a connector is not configured for the application 104. In one or more embodiments, the data transformation and response system 100 can generate a notification that indicates that the generative response 114 is missing information and that establishing a connector with the application 104 would provide additional information for the generative response 114. In particular, the data transformation and response system 100 can determine that a connector would facilitate access certain data from the application 104, thereby improving the generative response 114. The data transformation and response system 100 can generate the generative response 114 as a preview response that contains a data segment from a content item accessible without a connector and generate a notification that additional generative functions are available upon establishing a connector with the application 104. Further, upon establishing a connector with the application 104, the data transformation and response system 100 can update the preview response to include additional information received through the connector. Additional details regarding the data transformation and response system 100 generating a preview response and updating a preview response upon establishing a connector with an application are provided below with respect to FIG. 4. Further, additional details and example graphical user interfaces of the data transformation and response system 100 generating a generative response and updating the preview response upon establishing a connector with the application are provided below with respect to FIGS. 6A-6D.

The data transformation and response system 100 provides a variety of technical advantages relative to conventional systems. For example, unlike conventional systems that rely on connectors to generate generative output, the data transformation and response system increases flexibility relative to conventional systems by generating and indexing formatted local data for use in generating generative responses. Specifically, the data transformation and response system 100 transforms local data into formatted local data and indexes the formatted local data in a local index, so the data transformation and response system 100 can easily access and utilize the formatted local data to generate generative responses, even without a connector established for generative responses. Moreover, because the data transformation and response system 100 indexes and stores the formatted local data in a local index, the data transformation and response system 100 does not rely on the connector for receiving formatted data to generate generative responses. Further, even after establishing a connector with an application, the data transformation and response system 100 indexes meaningful data, such as screen capture metadata and/or interaction metadata, so the data transformation and response system 100 can flexibly employ whatever information is most suitable for generating a generative response.

In addition, the data transformation and response system 100 improves accuracy relative to conventional systems. For instance, unlike conventional systems that rely solely on application data obtained through an integration or a connector, the data transformation and response system 100 generates additional contextual data (not available through an integration or connector) that enhances the accuracy of the information used to produce a response. Specifically, the data transformation and response system 100 generates screen capture metadata describing spatial, structural, visual, or other attributes corresponding to content that is displayed in the application. In addition, the data transformation and response system 100 generates interaction metadata that provides additional detailed insight into user behavior. Indeed, by generating these additional types of contextual data, which are often not available through connectors or other integrations and provide detailed insight into displayed content and user behavior, the data transformation and response system 100 can generate more accurate generative responses that account for details that conventional systems are unable to account for.

Further, the data transformation and response system 100 increases efficiency relative to conventional systems. In particular, unlike conventional systems where missing data from application integrations forces them to perform extra computation to infer missing information, leading to slower processing and increased resource use, the multi-modal data generated and used by the data transformation and response system 100 results in increased efficiency (without requiring establishment of a formal connector). For example, as previously described, the data transformation and response system 100 generates additional data that supplements the knowledge and contextual understanding available to a generative model, so the generative model does not need to perform additional processing to generate generative responses. Further, because the data transformation and response system 100 generates more accurate generative responses, the data transformation and response system 100 thereby avoids repeated user queries and redundant computation cycles.

Figure 2:
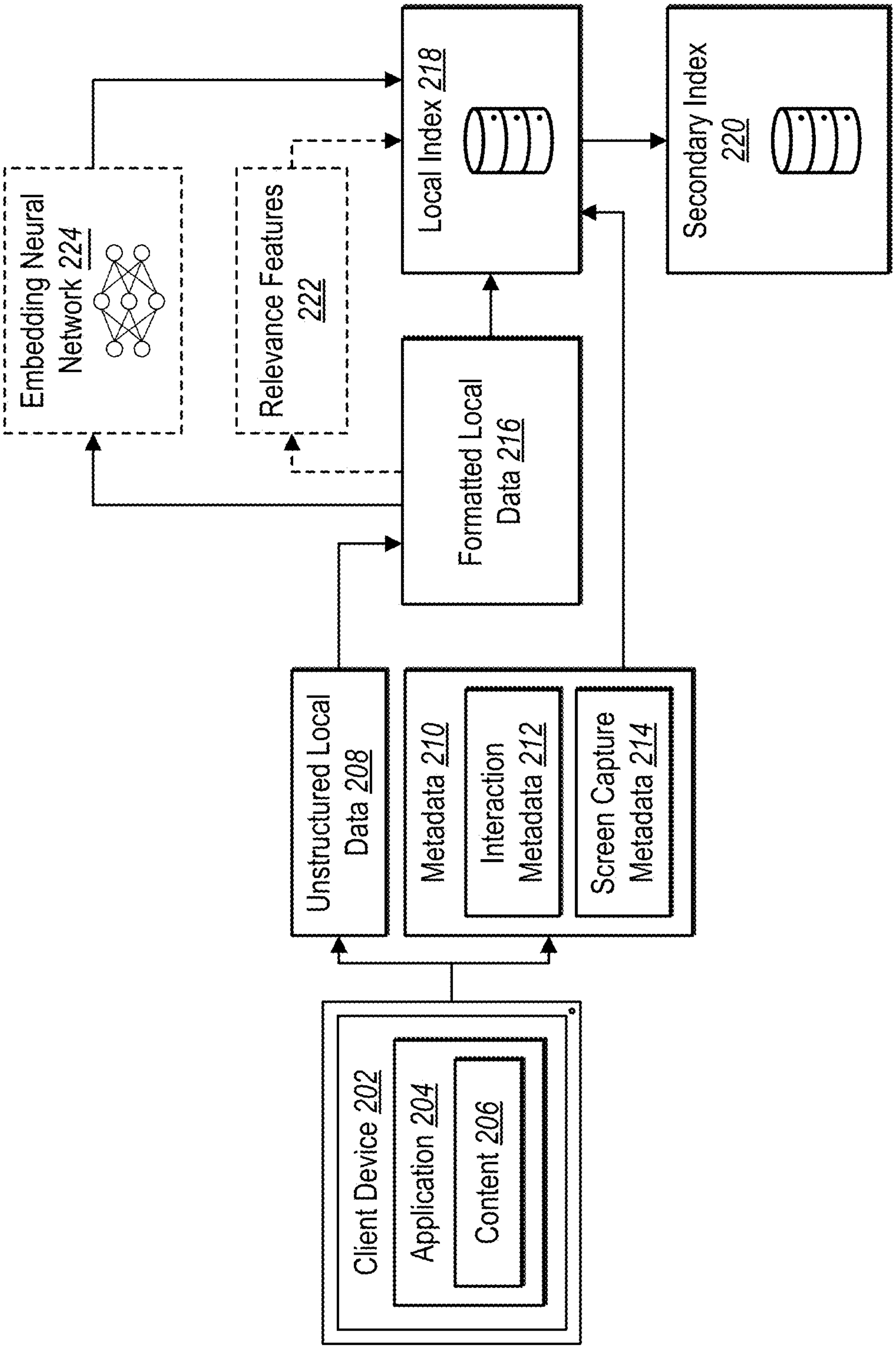
FIG. 2 illustrates a schematic diagram of a data transformation and response system transforming unstructured local data into formatted local data and indexing the formatted local data in a local index in accordance with one or more embodiments.

As previously mentioned, the data transformation and response system 100 transforms unstructured local data into formatted local data and indexes the formatted local data in a local index. In particular, the data transformation and response system 100 transforms unstructured local data to formatted local data by applying a data format compatible with a connector and indexing the formatted local data in a local index associated with a client device. FIG. 2 illustrates a schematic diagram of a data transformation and response system transforming unstructured local data into formatted local data and indexing the formatted local data in a local index in accordance with one or more embodiments.

As shown in FIG. 2, the data transformation and response system 100 receives unstructured local data 208 from application 204 running locally on client device 202. As used herein, the term "unstructured local data" refers to data associated with a client device that lacks a predefined schema or a fixed organizational format. In particular, the term "unstructured local data" can include information produced from, maintained by, or residing within an application executing on a client device that is not arranged according to a prescribed data model and has no fixed structural schema. For example, unstructured local data can be generated from various processes of an application running on a client device, such as internal processes of an application, user interactions with an application, or content displayed within an application. As an illustration, unstructured local data can include text, message content, log entries, user interaction traces, cached artifacts, computer code segments, binary, or other mixed-format application outputs.

As shown, in one or more embodiments, the data transformation and response system 100 receives unstructured local data 208 that includes or represents content 206 associated with application 204. In particular, the data transformation and response system 100 receives unstructured local data 208 that includes content 206 that is information or data presented, generated, or maintained within an interface or data store of the application 204. For example, content 206 can include data specific to the application 204 or for which the application 204 is designed to generate. As an illustration, if the application 204 is an email application, the content 206 can include text of an email, a subject line of an email, correspondents of an email, or other aspects of an email.

In some embodiments, the application 204 is associated with a content management system (e.g., content management system 704 as further described below in FIG. 7) that the data transformation and response system 100 is a part of In particular, the application 204 can be associated with the content management system, so the content management system can receive data and perform actions corresponding to functions of the content management system. For example, the application 204 can have a file synchronization connector or other integration (e.g., webhook, API, event streams, embedded interfaces, or protocol-level integrations) with the content management system through which the content management system can facilitate file synchronization and storage functions. Through a file synchronization connector, the content management system can access the application 204 and receive unstructured local data 208, but a file synchronization connector does not provide the application data, metadata, and contextual signals through which the data transformation and response system 100 can perform generative functions.

In addition, in some embodiments, the data transformation and response system 100 can receive unstructured local data 208 from other applications (e.g., other than application 204). For example, the data transformation and response system 100 can receive unstructured local data 208 from various third-party applications associated with the data transformation and response system 100 (or the content management system). The data transformation and response system 100 can access the unstructured local data 208 in an index associated with the third-party application or in a server index of the content management system. Moreover, the data transformation and response system 100 can receive unstructured local data 208 by receiving system data associated with the client device 202. For example, the data transformation and response system 100 can access a local file system and extract system data.

Further, as another example, the data transformation and response system 100 can receive unstructured data from a browser on client device 202. Specifically, the data transformation and response system 100 can utilize an application or connector with a browser on the client device 202 through which the data transformation and response system 100 can receive browser database files. In addition, in some instances, the data transformation and response system 100 can receive unstructured local data 208 by receiving browsing data from a browser associated with the client device 202. For example, the data transformation and response system 100 can have a connector with the browser, through which the data transformation and response system 100 receives unstructured local data 208.

In one or more embodiments, the data transformation and response system 100 can index unstructured local data 208 from other applications and/or browsers. More specifically, the data transformation and response system 100 can index the unstructured local data 208 in a prioritized index for easy retrieval and use in downstream applications. For example, the data transformation and response system 100 can index unstructured local data 208 in a server index associated with the content management system. In some cases, the data transformation and response system 100 indexes the unstructured local data 208 in a prioritized server index based on a search ranking score indicating a priority for the unstructured local data 208.

As previously mentioned, the data transformation and response system 100 transforms the unstructured local data 208 into formatted local data 216. As used herein, the term "formatted local data" refers to data that has been programmatically transformed into a specific, standardized data format. In particular, the term "formatted local data" includes data that is transformed from an unstructured form into a defined schema or structural representation through interpretation and re-encoding to align with a data primitive of a prescribed connector or application. For example, formatted local data can include data that is transformed from an unstructured format into a specific data format chosen to enable interpretation by a specific system or component.

In some embodiments, the data transformation and response system 100 transforms the unstructured local data 208 into formatted local data 216 by applying a data format compatible with a connector corresponding to the application 204. More specifically, the data transformation and response system 100 determines a data format for a connector that connects the application 204 to the content management system (e.g., content management system 704) and applies the data format for the connector to the unstructured local data 208. For example, the data transformation and response system 100 programmatically interprets the unstructured local data 208 and converts it to a predefined, standardized data format that is used by the connector when facilitating retrieval, transmission, or synchronization of data between the application 204 and the content management system.

As further shown, the data transformation and response system 100 indexes the formatted local data 216 in a local index 218. As used herein, the term "local index" refers to a data structure for storing data associated with a computing device or particular user context. More specifically, the term "local index" refers to a data structure that enables efficient identification, retrieval, or organization of data originating from a specific computing device or a user account spanning multiple computing devices. In one or more embodiments, a local index is stored directly on a computing device. In some embodiments, a local index is maintained remotely by a server or content management system but stores local data specific to a computer device or user account.

In one or more embodiments, the data transformation and response system 100 indexes the formatted local data 216 in the local index 218 for efficient identification, access, and processing of the formatted local data 216 in downstream operations corresponding to the client device 202. For example, the data transformation and response system 100 indexes the formatted local data 216 in the local index 218 for generating generative responses specific to the client device 202 (or a user account associated with client device 202). As another example, the data transformation and response system 100 can index the formatted local data 216 in an index format that matches an index associated with a connector for application 204 (e.g., to facilitate downstream combining the formatted local data 216 with data from the connector). Further, as described above in relation to FIG. 1, the data transformation and response system 100 can utilize an embedding neural network 224 to generate formatted local embeddings and further store the formatted local embeddings in a formatted local embedding vector store associated with the local index 218.

The data transformation and response system 100 can index the formatted local data 216 at various time periods. For example, in some embodiments, the data transformation and response system 100 continuously monitors and extracts the unstructured local data 208 and continuously transforms the unstructured local data 208 into the formatted local data 216 and indexes in the local index 218. In other embodiments, the data transformation and response system 100 indexes the formatted local data 216 at various time periods, such as 200-500 milliseconds, every 1 second, or every 2-5 seconds. The data transformation and response system 100 can also dynamically index data in response to triggers by detecting changes in local application data and indexing the formatted local data 216 in the local index 218 in response to such changes, such as by monitoring data flow and indexing the formatted local data 216 at periodic intervals based on the data flow.

As illustrated, in some embodiments, the data transformation and response system 100 generates or receives metadata 210 corresponding to the unstructured local data 208. In particular, the data transformation and response system 100 generates or receives the metadata 210 that includes attributes, identifiers, or contextual indicators for the unstructured local data 208. In some instances, the data transformation and response system 100 receives the metadata 210 from the application 204 as a data object associated with unstructured local data 208.

In other instances, the data transformation and response system 100 generates the metadata 210 as ancillary information for the unstructured local data 208. For example, in one or more embodiments, the data transformation and response system 100 generates interaction metadata 212. As used herein, the term "interaction metadata" refers to metadata generated in association with user interactions with an application or computing device. For example, interaction metadata corresponds to user actions within an application or device environment and captures contextual details such as inputs, selections, navigation behavior, or other interaction-related attributes. In some cases, metadata indicates an application that corresponds to unstructured local data and/or formatted local data (e.g., unstructured local data 208 and/or formatted local data 216 came from the Slack application).

In one or more embodiments, the data transformation and response system 100 generates the interaction metadata 212 by detecting user interactions with the application 204 and/or client device 202 and encoding the user interactions. More specifically, the data transformation and response system 100 determines contextual attributes associated with user actions and encodes the contextual attributes in a structured form that links the user interactions to the unstructured local data 208. For example, the data transformation and response system 100 can generate the interaction metadata 212 that includes selections of interface elements, sequences of navigation actions, timestamps of those actions, and user inputs within the application 204. By generating the interaction metadata 212 the data transformation and response system 100 can capture user interaction data that is often not available even after establishing a connector with the application 204. Indeed, connectors often provide data corresponding to an application's content or state rather than user interactions with the application, so by generating the interaction metadata 212, the data transformation and response system 100 is able to more accurately identify relevant application content, reduce ambiguity inherent in the unstructured local data 208, and enable more precise retrieval, processing, and interpretation of local data, thus generating more accurate generative responses.

As also shown, in some embodiments, the data transformation and response system 100 generates screen capture metadata 214 from the application 204. As used herein, the term "screen capture metadata" refers to metadata generated by extracting or analyzing content displayed within a user interface during a screen capture operation. More particularly, the term "screen capture metadata" refers to structured information generated by scraping or retrieving content from a user interface, including identifiers of visible elements, extracted text or graphics, layout characteristics, timestamps, and other contextual attributes that describe or relate to the captured screen content. For example, screen capture metadata can refer to data captured from an application, a browser, application-specific viewers, underlying application layers, content items accessed but not visible to the user, or cached content that is not visible to the user. Screen capture metadata can include window data indicating content displayed in particular windows and/or where the windows are located within an interface on a display. Screen capture metadata can further include pixel data indicating colors or content displayed by pixels at respective pixels coordinates of a display.

In one or more embodiments, the data transformation and response system 100 generates screen capture metadata 214 by extracting data displayed within the application 204. More specifically, the data transformation and response system 100 can generate a screen capture of application 204 and can generate the screen capture metadata 214 that encodes content displayed within the application. In some cases, the data transformation and response system 100 generates screen capture metadata as described in CATALYST APPLICATION FOR EXTRACTING AND EXECUTING TASKS, U.S. patent application Ser. No. 18/435,023, filed Feb. 7, 2024, which is hereby incorporated by reference herein in its entirety. By capturing data displayed within an application, the data transformation and response system 100 can receive information corresponding to the application 204 that is not provided in data from the application 204, even after establishing a connector with application 204. Indeed, connectors often provide a limited set of information for an application, so by generating the screen capture metadata 214, the data transformation and response system 100 can generate generative responses that capture information not available to conventional systems, increasing the flexibility of the data transformation and response system 100 over conventional systems.

As shown, the data transformation and response system 100 indexes the metadata 210 in the local index 218. In particular, the data transformation and response system 100 indexes the metadata 210, the interaction metadata 212, and/or the screen capture metadata 214 with the formatted local data 216 in the local index 218. The data transformation and response system 100 can access and process the metadata 210 and the formatted local data 216 together during downstream operations, which provides richer information to filter, rank, and retrieve the formatted local data 216 more accurately and efficiently.

In some instances, the data transformation and response system 100 indexes the formatted local data and the metadata 210, even after generating a connector with the content management system to receive application data for generating generative responses. In many instances, connectors that allow a content management system to receive the unstructured local data 208 and perform limited functions (e.g., for file storage purposes) do not store data as historic knowledge for downstream generative functions. Thus, even after generating a connector for generating generative responses, the data transformation and response system 100 indexes the formatted local data 216 as stored knowledge (or historic knowledge) for downstream generative functions.

As also shown, in some embodiments, the data transformation and response system 100 generates relevance features 222 for the formatted local data 216. More particularly, the data transformation and response system 100 generates the relevance features 222 and indexes the formatted local data 216 based on the relevance features 222. For example, the data transformation and response system 100 extracts content-derived signals from the formatted local data 216 to characterize properties of the formatted local data 216. The data transformation and response system 100 further indexes the formatted local data 216 in local index 218 as a prioritized local index based on the relevance features 222 to provide structured signals that allow the data transformation and response system 100 to distinguish, organize, and efficiently retrieve formatted local data 216 for use in downstream operations (e.g., for a generative model to generate a generative response).

In some cases, the data transformation and response system 100 generates the relevance features 222 by generating a title feature as a processed representation for a title corresponding to the formatted local data 216. For instance, the data transformation and response system 100 can generate a normalized token, lexical similarity score, or semantic embedding that helps the data transformation and response system 100 index items.

In addition, in some instances, the data transformation and response system 100 generates relevance features 222 by generating a lexical score for the formatted local data 216. More particularly, the data transformation and response system 100 generates a lexical score that indicates how closely the formatted local data 216 aligns with another piece of text (e.g., a reference text for the local index). For example, the data transformation and response system 100 can use the lexical score for the formatted local data 216 to determine where to index the formatted local data 216 in the local index 218. In one or more embodiments, the data transformation and response system 100 can generate a lexical score upon retrieval, such as in response to a query. For example, the data transformation and response system 100 can generate an initial lexical score prior to indexing the formatted local data 216 and a query lexical score that responds to a query.

Moreover, the data transformation and response system 100 can generate relevance features 222 by generating a semantic feature for the formatted local data 216. For instance, the data transformation and response system 100 generates a semantic feature by generating a semantic embedding that represents the underlying meaning or conceptual information of the formatted local data 216, such as topics, concepts, relationships, or intent. The data transformation and response system 100 can index the formatted local data 216 based on the semantic feature and/or compare the semantic feature to a query (e.g., a query corresponding to generating a generative response).

As shown, in one or more embodiments, the data transformation and response system 100 can relocate the formatted local data 216 from the local index 218 to the secondary index 220. In particular, the data transformation and response system 100 relocates the formatted local data 216 from the local index 218 to the secondary index 220 based on determining that the formatted local data 216 satisfies criteria for relocating the formatted local data 216 from the local index 218 to the secondary index 220. For example, the data transformation and response system 100 can determine that the formatted local data 216 meets criteria such as age, access frequency, relevance scores, storage limitations, or policy-driven retention rules for relocating the formatted local data 216 from local index 218 to secondary index 220. Further, the data transformation and response system 100 can access data from the local index 218 or the secondary index 220 for downstream operations.

In one or more embodiments, the data transformation and response system 100 temporarily indexes the formatted local data 216 in the local index 218, prior to storing the formatted local data 216 in the secondary index 220. More specifically, the data transformation and response system 100 temporarily indexes the formatted local data 216 in the local index 218 while ingestion into the secondary index 220 is pending. For example, the data transformation and response system 100 formats and retains the formatted local data 216 in the local index 218, after which the data transformation and response system 100 uploads and indexes the formatted local data 216 in the secondary index 220 that is maintained by a server (e.g., a content management system server).

The data transformation and response system 100 can also remove data from the local index 218 and/or the secondary index 220 so the data is not available for downstream operations, such as generating generative responses. For example, the data transformation and response system 100 can determine a modification to a user account and remove data from the local index 218 and/or the secondary index 220. As an illustration, the data transformation and response system 100 can remove data based on determining that a user account was removed from an application (e.g., a third-party application), removed from a portion of an application (e.g., a Slack Channel), or a user account corresponding to a third-party application is no longer active.

Figure 3:
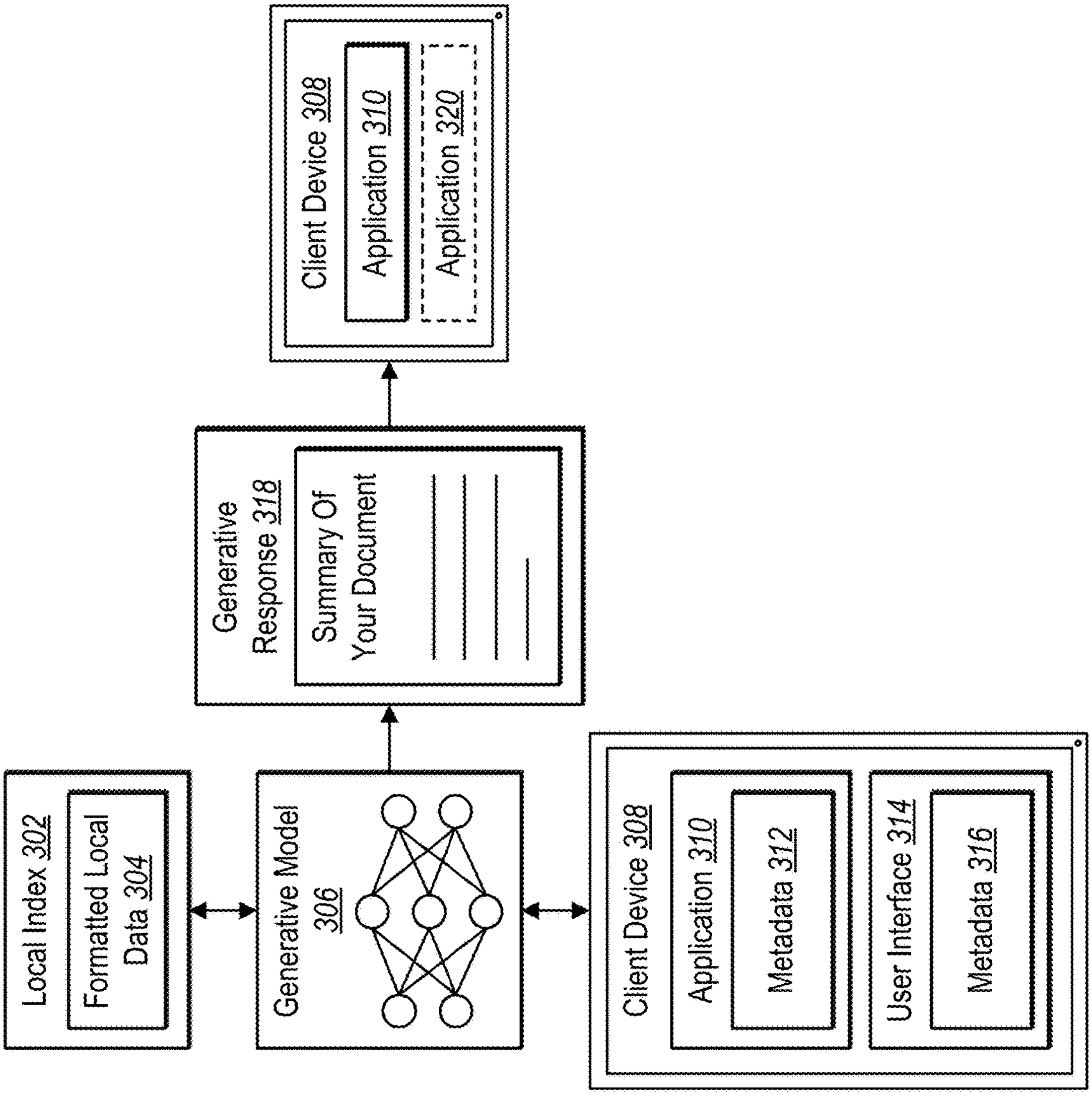
FIG. 3 illustrates a schematic diagram of a data transformation and response system utilizing formatted local data to generate a generative response in accordance with one or more embodiments.

As previously mentioned, in one or more embodiments, the data transformation and response system 100 utilizes formatted local data to generate a generative response. In particular, the data transformation and response system 100 utilizes formatted local data from the local index and, in some cases, data from additional data sources to generate generative responses. FIG. 3 illustrates a schematic diagram of a data transformation and response system utilizing formatted local data to generate a generative response in accordance with one or more embodiments.

As shown in FIG. 3, the data transformation and response system 100 utilizes a generative model 306 to generate a generative response 318 from formatted local data 304 in local index 302. As used herein, the term "generative response" refers to an output generated by a generative model that synthesizes information from available data sources. In particular, the term "generative response" refers to a synthesized response dynamically constructed based on contextual inputs, including stored data, user-provided prompts, content items, locally captured signals, contextual signals, or system-provided prompts. For instance, a generative response reflects an inferred understanding of a current context for a user and produces a coherent, task-oriented output that appears responsive to activity occurring within one or more applications. In some cases, a generative response is generated in response to a query, for instance as a response for a search query corresponding to a content item.

As mentioned, the data transformation and response system 100 accesses the formatted local data 304 in the local index 302 to generate the generative response 318. More particularly, the data transformation and response system 100 generates the generative response 318 as a synthesized response that uses the formatted local data 304 to generate the generative response 318 that corresponds to an ongoing state or activity within the application 310, the user interface 314, or in response to a query. For instance, the data transformation and response system 100 generates the generative response 318 as a suggested response based on observed and/or contextual signals identified in the application 310, the user interface 314, and/or the client device 308. Indeed, the data transformation and response system 100 can generate the generative response 318 to emulate a generative response that the data transformation and response system 100 (or the content management system) would generate if there were a connector with the application 310 of formatted local data 304, even if there is not a connector.

In addition to accessing the formatted local data 304 in the local index 302 to generate the generative response 318, the data transformation and response system 100 can also access the formatted local data 304 in a secondary index (e.g., secondary index 220, as described above in relation to FIG. 2). More particularly, the data transformation and response system 100 can access the local index 302 and/or the secondary index to generate the generative response 318. For example, the data transformation and response system 100 accesses the local index 302 and/or a secondary index, then identifying and utilizes the relevant data for generating the generative response 318, whether the formatted local data 304 is indexed in the local index 302 and/or the secondary index.

In one or more embodiments, the data transformation and response system 100 generates the generative response 318 based on a user input corresponding to the application 310. In particular, the data transformation and response system 100 receives a user input corresponding to the application 310 running locally on the client device 308. For example, as mentioned, the data transformation and response system 100 can receive a query corresponding to the application 310 or to a content item executing locally in application 310 on client device 308. As another example, in some cases, the application 310 is an application of the content management system for generating generative responses, and the data transformation and response system 100 can receive a user input corresponding to requesting the generative response 318.

In one or more embodiments, the data transformation and response system 100 receives user input by receiving a user input within an application that is not the application 310 corresponding to the formatted local data 304. More specifically, the data transformation and response system 100 can receive a user input in an application that is running in parallel with the application 310 on the client device 308. For example, if the application 310 is a third-party application, the data transformation and response system 100 can receive additional input within an application of the content management system running locally on the client device 308. As an illustration, the data transformation and response system 100 can receive a user input within an application of the content management system of a query responding to a content item of the application 310. The data transformation and response system 100 can utilize formatted local data 304 corresponding to the application 310 to generate the generative response 318 and provide the generative response 318 within the application of the content management system.

As also shown, in one or more embodiments, the data transformation and response system 100 utilizes additional data from client device 308 to generate the generative response 318. More particularly, the data transformation and response system 100 accesses (or receives) data from client device 308 and synthesizes the generative response 318 using multi-modal data from the formatted local index and from various data sources originating from one or more applications executing on client device 308. For example, the data transformation and response system 100 extracts data from an application associated with the formatted local data 304 and uses the extracted data with the formatted local data 304 to generate the generative response 318.

In some embodiments, the data transformation and response system 100 accesses (or receives) data from an application 310 running locally on client device 308 (e.g., an email application, a web browser, a messaging application, or some other application). More particularly, the data transformation and response system 100 generates the generative response 318 using extracted data from the application 310 currently executing on client device 308 in conjunction with formatted local data 304 from local index 302. For instance, the data transformation and response system 100 can extract data from the application 310 that corresponds to data that is currently displayed in the application 310, or data corresponding to user interactions with the application 310 (e.g., real-time or concurrent interactions). The data transformation and response system 100 can then generate the generative response 318 that incorporates concurrent information in addition to prior knowledge from the formatted local data 304 indexed in (and easily accessible from) local index 302.

As shown, in some instances, the data transformation and response system 100 extracts data from application 310 by extracting metadata 312. More particularly, the data transformation and response system 100 extracts (or generates) the metadata 312 from the application 310, where the metadata 312 captures information and data displayed in the application 310. For instance, as user interactions within the application 310 trigger modifications (or updates) of elements within the application 310, the data transformation and response system 100 derives structured representations (e.g., screen capture metadata) from the displayed data and uses that the structured representations to maintain an up-to-date understanding of a visible state of the application 310. In addition, the data transformation and response system 100 can also generate metadata 312 by accessing cached files associated with the application 310 (e.g., accessing cached files within storage locations associated with the application 310, such as Google Drive or Microsoft OneDrive). Further, in one or more embodiments, the data transformation and response system 100 can extract metadata 312 using an extension associated with the data transformation and response system 100 (or the content management system), through which the data transformation and response system 100 can receive data corresponding to user activity within the application 310.

The data transformation and response system 100 can also generate the metadata 312 at various time periods. In some cases, the data transformation and response system 100 continuously generates the metadata 312 by acquiring and analyzing visual content displayed within the application 310 as a presentation layer of the application 310 changes in real time. In other instances, the data transformation and response system 100 periodically generates the metadata 312 by capturing and processing the visual content of the application 310 at defined intervals (or time periods) to obtain snapshots of its presentation state over time. Further, in additional instances, the data transformation and response system 100 generates the metadata 312 in response to a trigger, such as opening a new window, launching an application, navigating to a different view, scrolling within an interface, or selecting an on-screen element.

As also shown, the data transformation and response system 100 can also generate metadata 316 from a user interface 314 provided via the client device 308. In particular, the data transformation and response system 100 can extract the metadata 316 from various browsers and interfaces of the client device 308 that are not associated with the application 310 (e.g., within an email application, messaging application, and/or a native application of the client device 308) corresponding to the formatted local data 304. For example, the data transformation and response system 100 can extract metadata 316 that corresponds to search queries and content from a browser on the client device 308.

Further, as shown and as previously mentioned, the data transformation and response system 100 provides the generative response 318 on the client device 308. In one or more embodiments, the data transformation and response system 100 provides the generative response 318 within the application 310 running locally on the client device 308. For example, the data transformation and response system 100 provides the generative response 318 as a contextual response that corresponds to data and/or content items within the application 310. In some instances, the application 310 is an application associated with formatted local data 304, so the data transformation and response system 100 synthesizes the generative response 318 using the metadata 312 and the formatted local data 304 and presents the generative response 318 within the application 310 as a context-aware response.

Figure 5A:
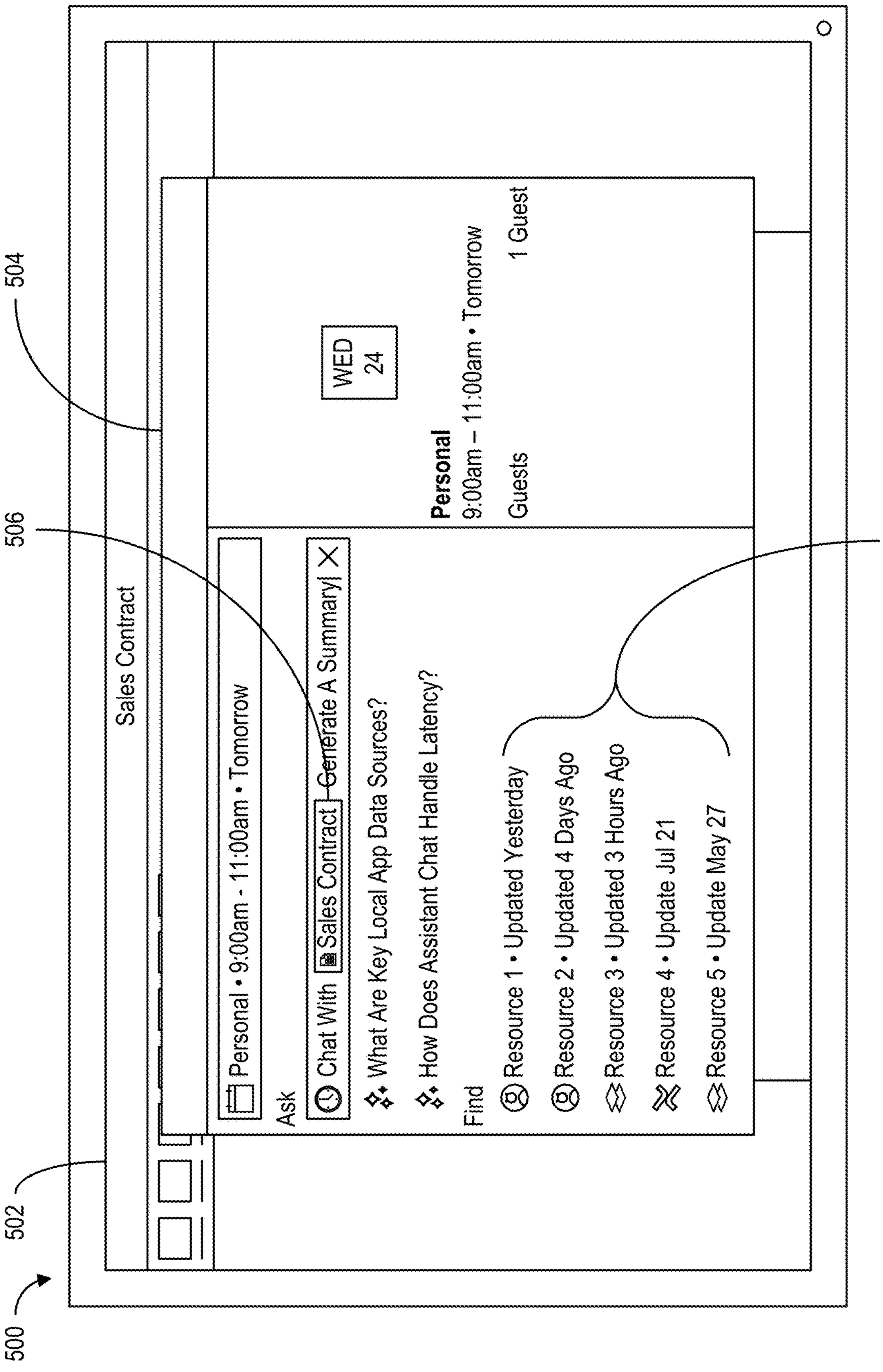
FIGS. 5A-5C illustrate example graphical user interfaces of the data transformation and response system using formatted local data to generate a generative response and providing the generative response via a third-party application on a client device in accordance with one or more embodiments.
Figure 5B:
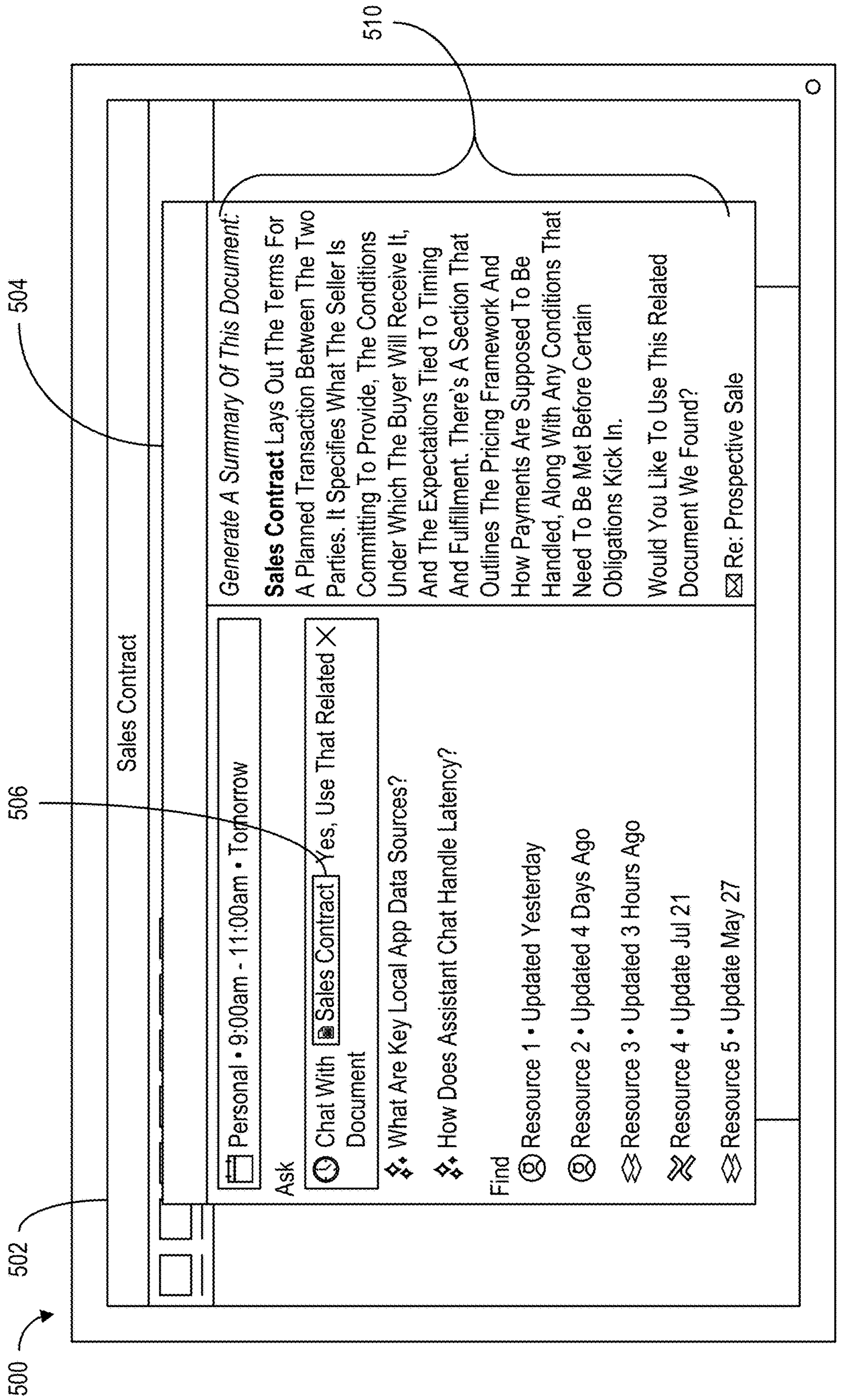
Figure 5C:
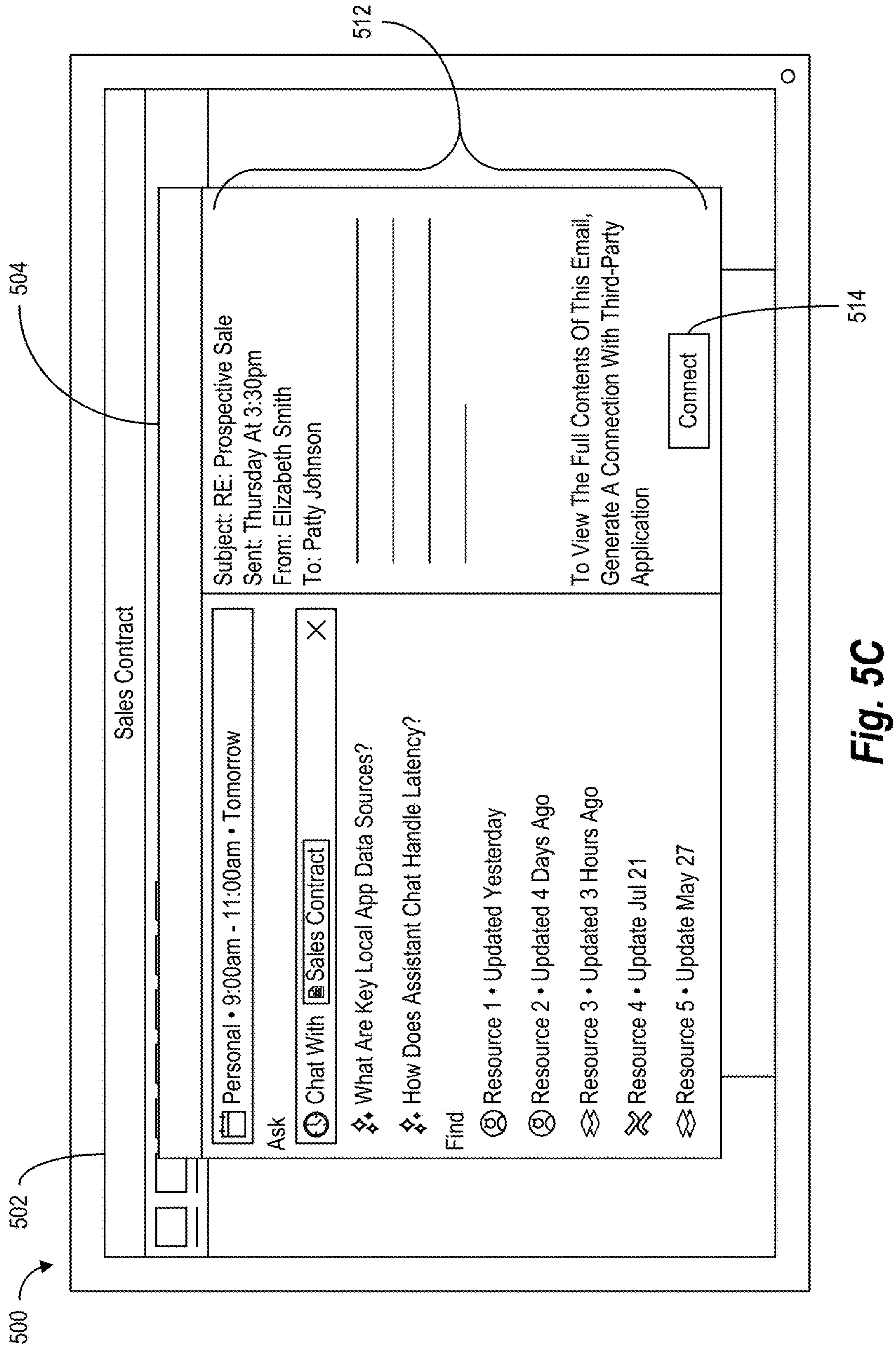

As also shown, in some embodiments, the data transformation and response system 100 provides the generative response 318 in application 320 that is an application running locally on the client device 308, but that is not the application corresponding to the formatted local data 304. For example, the application 320 can include content that is relevant to (or associated with) the formatted local data 304, the metadata 312, and/or the metadata 316, but was not the application from which the formatted local data 304 originated as unstructured local data. In some cases, the application 320 is an application of the content management system that ingests and displays generative responses from multi-modal data from a variety of sources. FIGS. 5A-5C illustrate the data transformation and response system 100, displaying a generative response in a third-party application associated with a content management system. FIGS. 6A-6D illustrate an application of the content management system providing a generative response. In other cases, the application 320 is a third-party application that is associated with the content management system and through which the data transformation and response system 100 can display the generative response 318.

Figure 4:
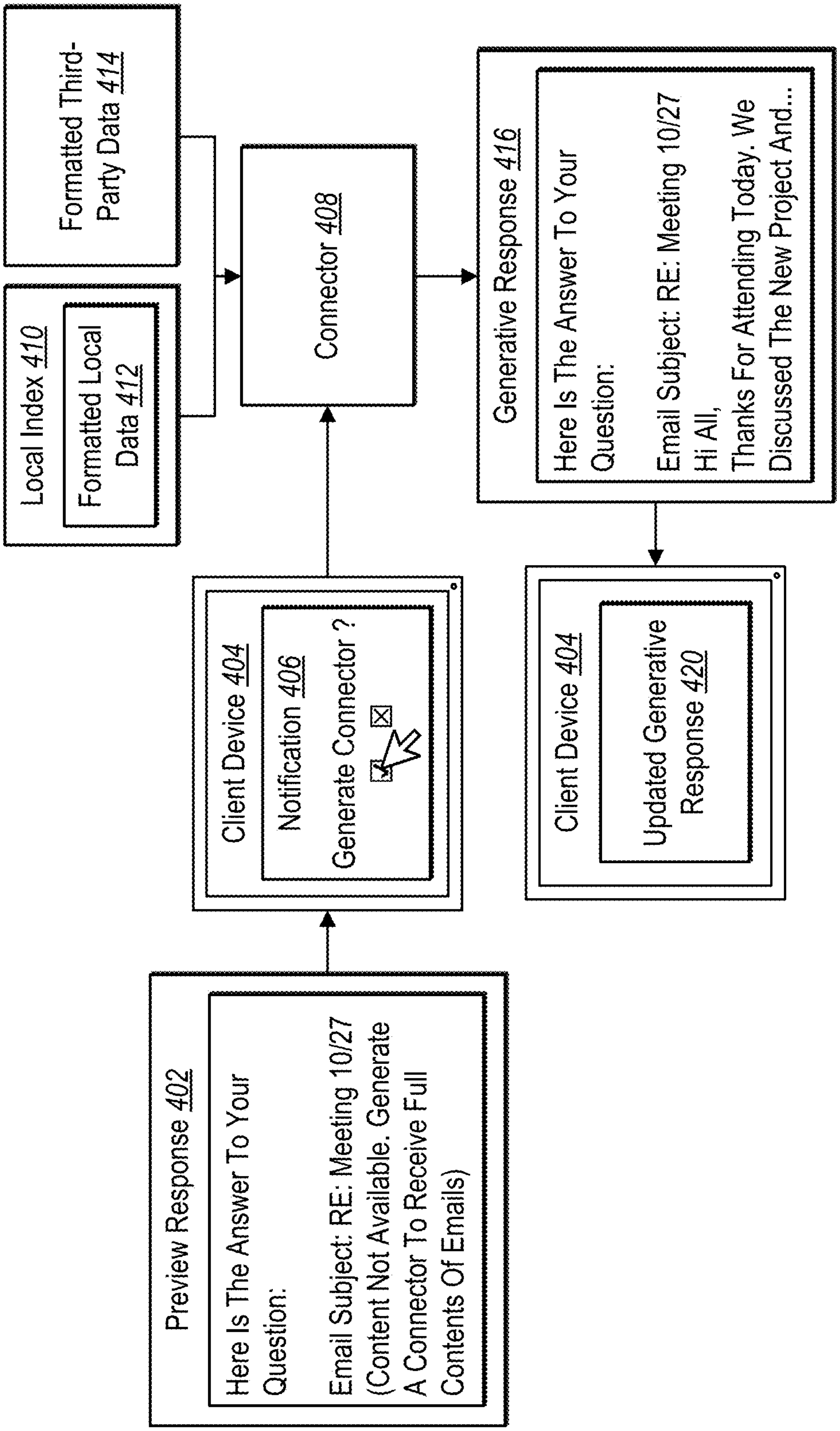
FIG. 4 illustrates a schematic diagram of a data transformation and response system generating an updated generative response in response to establishing a connector between a content management system and an application in accordance with one or more embodiments.

As previously mentioned, the data transformation and response system 100 stores formatted local data in a local index in a format that corresponds to a connector for an application. In one or more embodiments, the data transformation and response system 100 generates a preview response using formatted local data from the local index and generates a generative response upon generating a connector with the application. FIG. 4 illustrates a schematic diagram of a data transformation and response system generating a generative response in response to establishing a connector between a content management system and an application in accordance with one or more embodiments.

As shown in FIG. 4, in one or more embodiments, the data transformation and response system 100 generates a preview response 402. As used herein, the term "preview response" refers to a preliminary output generated using data currently accessible, and which omits information or detail that would be included in a generative response if additional data were available. More particularly, the term "preview response" refers to a preliminary or partial response generated from local data stored from local interactions with an application, where a computing device associated with the local data does not have a connector with the application, and data for a generative response is not available without the connector. For example, an application may provide a data segment corresponding to a content item, but to access additional content, the application requires a connector. A preview response can include the data segment corresponding to the content item but is missing portions due to the lack of a connector. As an illustration, an email application can provide a subject of an email but require a connector to access text of the body of the email, so a preview response would include the subject of the email. In some cases, a preview response can indicate that a connector is required to generate a generative response (e.g., a complete generative response).

In one or more embodiments, the data transformation and response system 100 generates the preview response 402 using formatted local data corresponding to an application running on client device 404. For example, the data transformation and response system 100 receives unstructured local data from the application running on the client device 404, generates formatted local data corresponding to the data segment of the unstructured local data, and accesses formatted local data from the local index to generate the preview response 402. In some cases, the data transformation and response system 100 generates metadata (e.g., metadata 210, as described above in relation to FIG. 2) that indicates the application to which the formatted local data corresponds, further indicating that additional data is available with a connector to the application.

In some embodiments, the data transformation and response system 100 generates the preview response 402 based on available data in a local index. More particularly, in instances where the data transformation and response system 100 relocates data to a secondary index (e.g., secondary index 220, as described above in relation to FIG. 2), the data transformation and response system 100 can generate the preview response 402 as a preliminary response that utilizes the data in a local index. The data transformation and response system 100 can generate the preview response 402 rather than expending additional compute cycles to locate and resolve supplemental data maintained in a secondary index or other auxiliary indexing structure.

As shown, the data transformation and response system 100 can provide the preview response 402 via the client device 404 with a notification 406. In particular, the data transformation and response system 100 can provide the preview response 402 with the notification 406 as a representative response that would be generated if there were a connector with an application, and the notification 406 can also indicate that additional generative functions are available with a connector to the application. For instance, the notification can indicate that the data transformation and response system 100 (or the content management system) can utilize additional data and generate generative responses when a connector is established. As an illustration, the data transformation and response system 100 can determine that formatted local data in a local index is limited to a time period (e.g., the last two weeks) and determine to generate the preview response 402 rather than expending additional processing power to search an additional index that includes formatted data older than the time period.

As shown, the data transformation and response system 100 can generate a connector 408. More specifically, the data transformation and response system 100 can generate a connector between an application (e.g., an application associated with formatted local data 412) and the content management system. For example, through the connector 408 with the application, the content management system can receive formatted third-party data 414 to generate (or update) generative responses. In some cases, the notification 406 includes an option to generate the connector 408 and, based on receiving a user interaction with the option, generates the connector 408 with the application.

In some cases, the data transformation and response system 100 generates the connector 408 as a connector specific to receiving data to generate generative responses. More particularly, an application can have a file synchronization connector with the content management system that allows for access to the application for limited functions of the content management system, such as file-level synchronization and storage functions. Through the file synchronization connection with the content management system, the data transformation and response system 100 can receive unstructured local data and limited functionality, but the connector 408 allows for access to application data for generative functions. For example, through the connector 408, the data transformation and response system 100 receives (or extracts) structured signals, metadata, and application-state information needed to support search, retrieval, semantic understanding, and generative-response workflows across multiple applications.

In one or more embodiments, upon generating the connector 408, the data transformation and response system 100 receives formatted third-party data 414 and generates a generative response 416. In particular, the data transformation and response system 100 receives the formatted third-party data 414 through the connector 408 and generates the generative response 416 that includes portions of the generative response that are missing from the preview response 402. For example, if preview response 402 includes an email subject line but the body of the email was missing (e.g., due to the lack of a connector with the application), the data transformation and response system 100 generates the generative response 416 that includes information from the body of the email after establishing the connector 408.

As shown, the data transformation and response system 100 can provide the generative response 416 via the client device 404 as an updated generative response 420. More specifically, the data transformation and response system 100 can provide the preview response 402 via client device 404 and, after establishing the connector 408, can update the preview response to the updated generative response 420. For instance, the data transformation and response system 100 can replace portions of the preview response 402 or add to the preview response 402 a synthesized output from formatted third-party data 414.

In one or more embodiments, the data transformation and response system 100 generates the generative response 416 based on an entry point for establishing the connector 408. The data transformation and response system 100 can generate the generative response 416 that corresponds to a point in a user interaction sequence or a location from which the data transformation and response system 100 received a user interaction to establish the connector 408. The data transformation and response system 100 can determine the entry point, identify data corresponding to the entry point, and generate the generative response 416 based on the entry point. For example, the data transformation and response system 100 can generate the generative response 416 that updates (or completes) the preview response 402 or generates the generative response 416 requested in a user input. As an illustration, if a user query requested a summary of a content item, upon establishing the connector 408, the data transformation and response system 100 can generate the generative response 416 by generating a summary of the content item.

Further, the data transformation and response system 100 can prioritize actions based on an entry point for establishing the connector 408. For example, if the data transformation and response system 100 generally starts extracting data upon establishing the connector 408, the data transformation and response system 100 can prioritize other actions based on the entry point for the connector 408. As an illustration, if the data transformation and response system 100 establishes the connector 408 after receiving a user query requesting an answer to a question for a content item, the data transformation and response system 100 can prioritize generating the generative response 416 of the answer to the question, rather than extracting data through the connector 408.

Additionally, in one or more embodiments, the data transformation and response system 100 combines the formatted third-party data 414 with the formatted local data 412. More particularly, the data transformation and response system 100 combines the formatted third-party data 414 and the formatted local data 412 in the local index 410 or another index for access when generating generative responses. In some cases, the data transformation and response system 100 determines that the formatted local data 412 includes data that is not included in the formatted third-party data 414 (or vice versa) and utilizes both the formatted local data 412 and formatted third-party data 414 to synthesize updated generative response 420. For instance, as previously mentioned, the data transformation and response system 100 can generate metadata, such as screen capture metadata or interaction metadata, which may not be available through the connector 408. The data transformation and response system 100 can generate the generative response 416 that incorporates formatted third-party data 414 and metadata from formatted local data 412, thus generating a more complete and accurate generative response.

In addition, in some embodiments, the data transformation and response system 100 generates a prioritized local index after combining the formatted third-party data 414 with the formatted local data 412. In particular, the data transformation and response system 100 generates relevance features for the formatted third-party data 414 and the formatted local data 412 and generates a prioritized local index that includes the formatted third-party data 414 and the formatted local data 412 ranked according to the relevance features. In some instances, the data transformation and response system 100 utilizes and/or updates previously generated relevance features for the formatted third-party data 414.

As previously mentioned, in one or more embodiments, the data transformation and response system 100 utilizes formatted local data to generate a generative response and provides a generative response within an application on a client device. In one or more embodiments, the data transformation and response system 100 provides a generative response within a third-party application on a client device. FIGS. 5A-5C illustrate example graphical user interfaces of the data transformation and response system using formatted local data to generate a generative response and providing the generative response via a third-party application on a client device in accordance with one or more embodiments. In particular, FIG. 5A illustrates an example graphical user interface for receiving a user query, FIG. 5B illustrates an example graphical user interface for providing a generative response within the third-party application, and FIG. 5C illustrates updating a generative response in response to a user input and providing an option to generate a connector with an application within the third-party application.

As shown in FIG. 5A, the data transformation and response system 100 provides a window 504 within an interface 502 of a third-party application 500 running locally on a client device where, the data transformation and response system 100 (or the content management system) does not have a connector established with the third-party application 500 for generating generative responses. In some cases, the data transformation and response system 100 generates the window 504 when the third-party application 500 is associated with the content management system. For example, the third-party application 500 can have an existing connector established with the content management system through which the data transformation and response system 100 can receive data (e.g., unstructured local data) and provide limited functionality between the third-party application 500 and the data transformation and response system 100, including generating the window 504 and various file synchronization actions.

As illustrated, the data transformation and response system 100 can provide an input option 506 through which the data transformation and response system 100 can receive user queries. For example, through input option 506, the data transformation and response system 100 can receive queries corresponding to a content item executing in third-party application 500, such as a summary, a search query corresponding to the content item executing on the third-party application, or a question about the content item.

As also shown, the data transformation and response system 100 and/or the content management system can provide indications of data options for generative responses. For example, the data transformation and response system 100 provides options 508 for related content items or data. The data transformation and response system 100 can provide options 508 that correspond to formatted local data stored within the local index (or the secondary index), content items with which a user recently interacted, data (or content items) from currently executing applications on the client device, or formatted data from existing connectors between other applications (or other third-party applications).

As illustrated, in FIG. 5B, the data transformation and response system 100 can provide a generative response 510 within the window 504. In particular, the data transformation and response system 100 utilizes formatted local data indexed within a local index to generate the generative response 510 to provide within the window 504. For example, the data transformation and response system 100 generates the generative response 510 that corresponds to the user query within the input option 506 using the formatted local data indexed within a local index and, in some instances, screen capture metadata generated by the data transformation and response system 100.

In addition, the data transformation and response system 100 can receive further user input in the input option 506. For instance, the data transformation and response system 100 can receive further user input corresponding to generative response 510, such as a clarifying question regarding generative response 510, a request to provide additional details, or a response to a prompt within generative response 510.

As illustrated in FIG. 5C, the data transformation and response system 100 can provide an updated generative response 512 in response to a further user input in input option 506, as just described and shown in FIG. 5B (e.g., "yes, use that related document"). More particularly, the data transformation and response system 100 compares the formatted local data indexed in the local index to the further user input to generate the updated generative response 512, including by using formatted local data from additional applications. For example, as shown, the data transformation and response system 100 can determine that formatted local data from an additional third-party application corresponds to (or is related to) the further user input and utilize the formatted local data from the additional third-party application to generate the updated generative response 512.

Further, as shown, the data transformation and response system 100 can generate a preview response as the updated generative response 512 (or the generative response 510). In particular, the data transformation and response system 100 can generate a preview response when the third-party application provides a data segment corresponding to a portion of a content item with unstructured local data (e.g., because the third-party application provides the missing data through a connector). Further, if the data transformation and response system 100 can provide an option 514 to establish a connector with the third-party application within window 504.

Figure 6A:
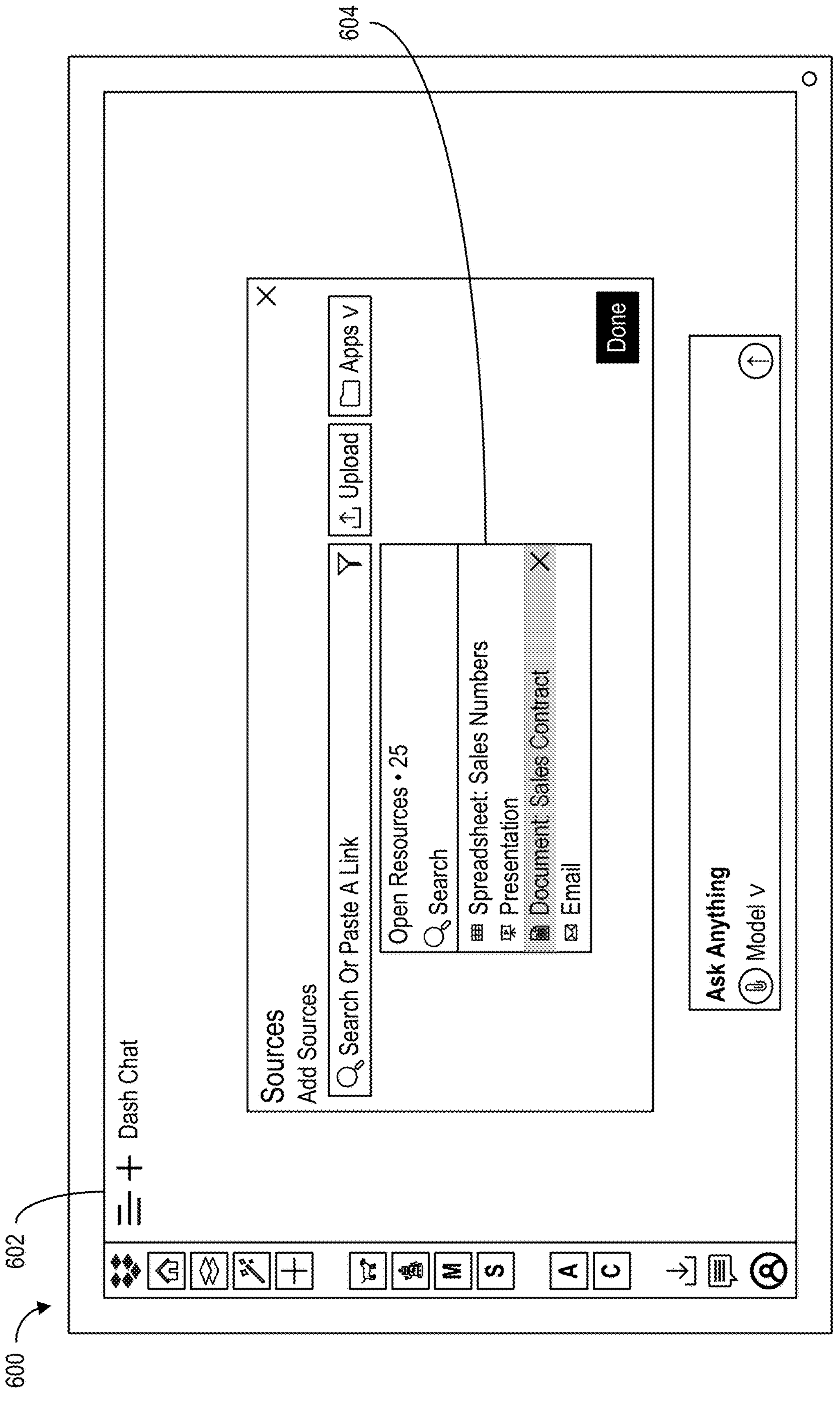
FIGS. 6A-6D illustrate example graphical user interfaces of the data transformation and response system generating a generative response and updating a generative response upon establishing a connector with an application in accordance with one or more embodiments.
Figure 6B:
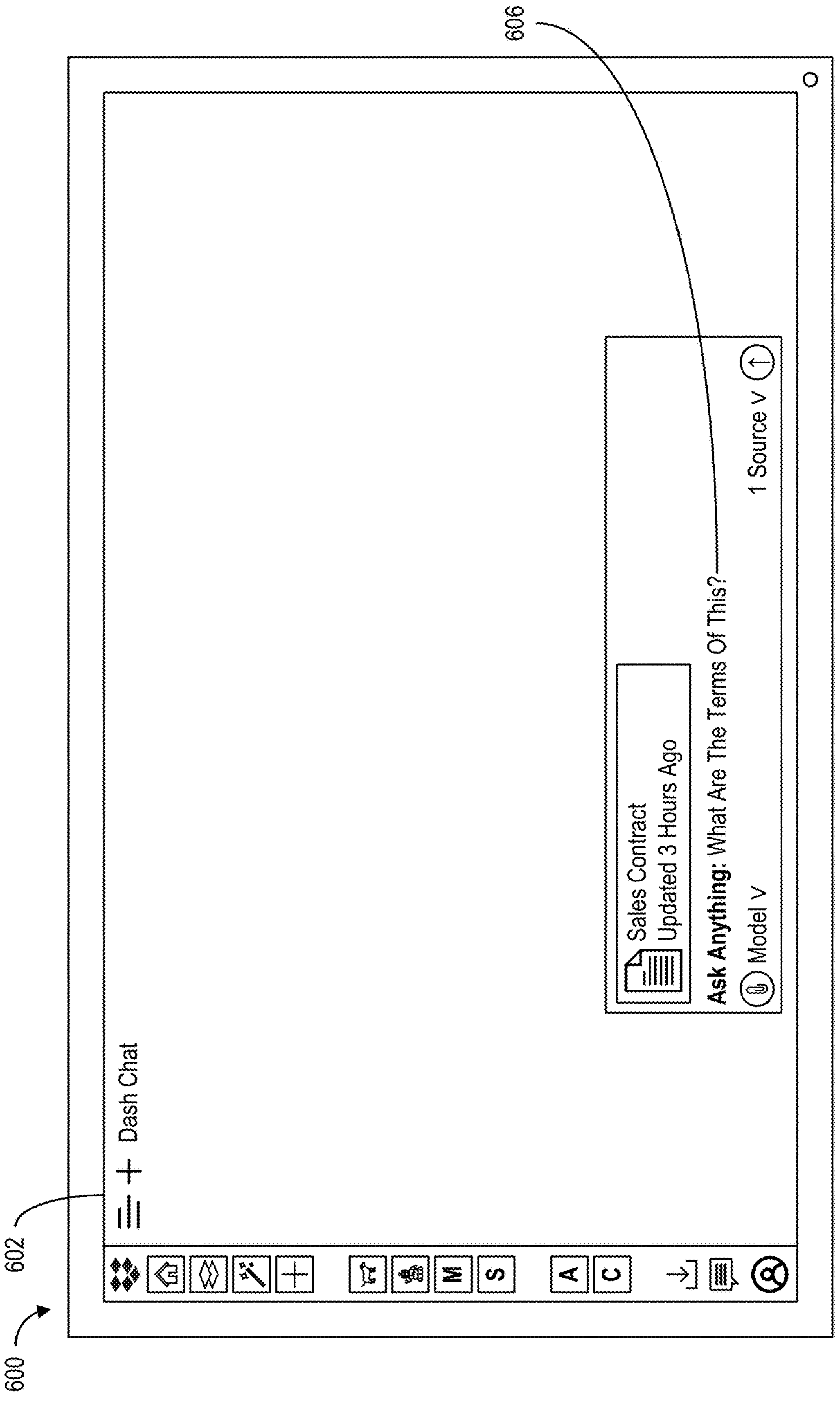
Figure 6C:
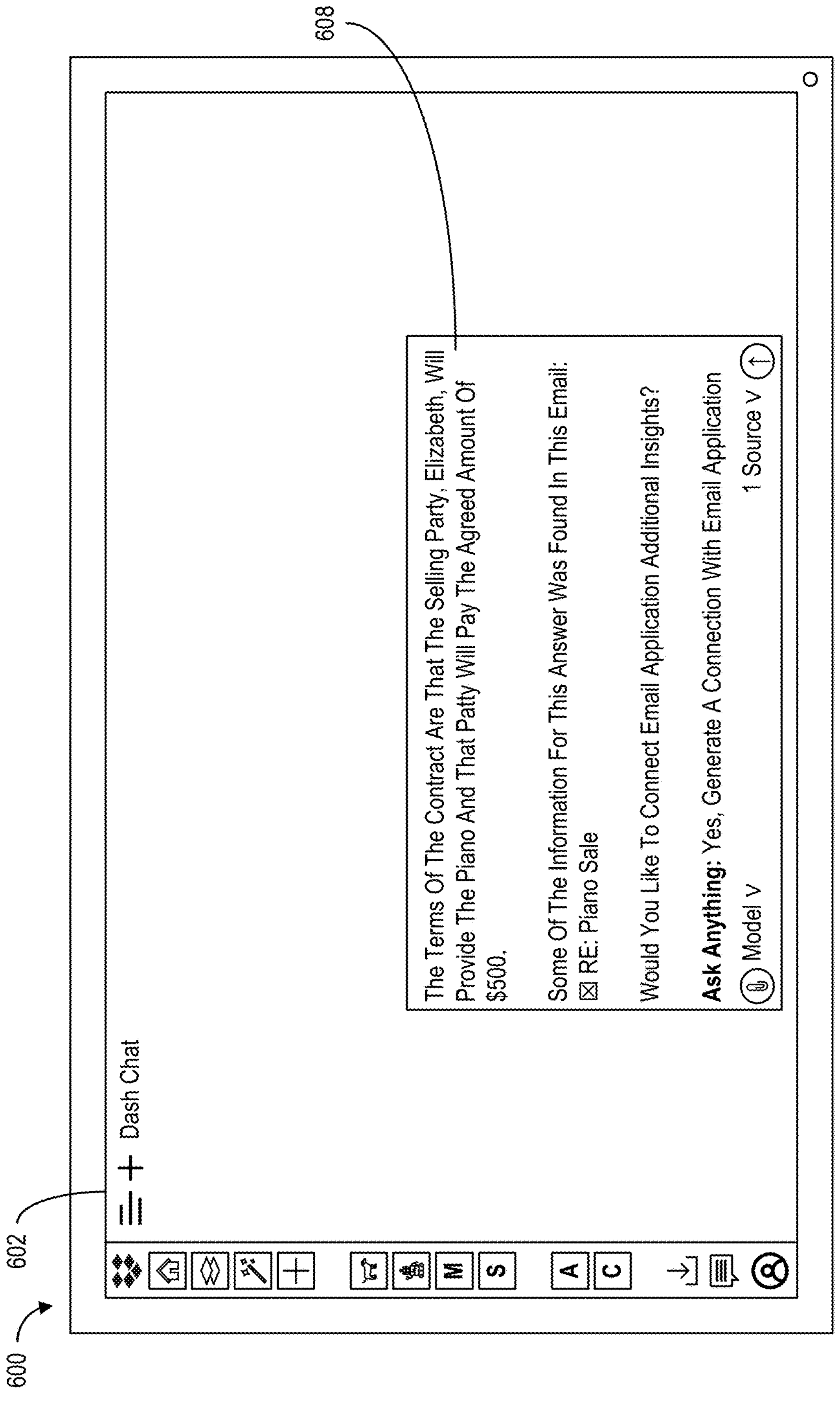
Figure 6D:
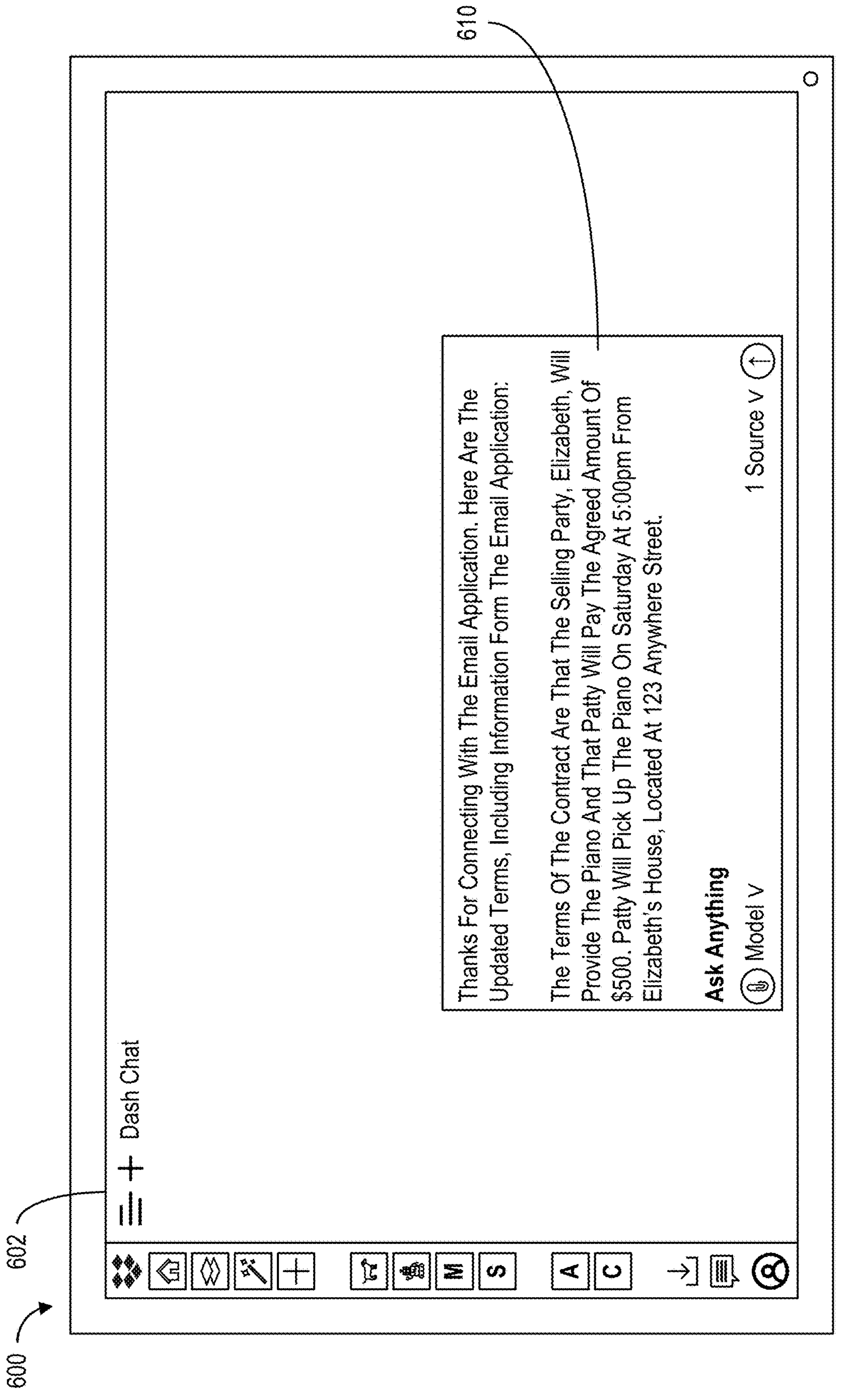

As previously mentioned, the data transformation and response system 100 can generate a generative response using formatted local data stored in a local index. In addition, the data transformation and response system 100 can update a generative response using additional generative functions or additional data available after establishing a connector with an application. FIGS. 6A-6D illustrate example graphical user interfaces of the data transformation and response system generating a generative response and updating a generative response upon establishing a connector with an application in accordance with one or more embodiments. In particular, FIG. 6A illustrates the data transformation and response system 100 providing options for content items available for generative responses, FIG. 6B illustrates the data transformation and response system 100 receiving a user query corresponding to a content item, FIG. 6C illustrates the data transformation and response system 100 providing a generative response and an option to generate a connector with an application for the content item, and FIG. 6D illustrates the data transformation and response system 100 generating and providing an updated generative response based on generating a connector with an application.

As shown in FIG. 6A, the data transformation and response system 100 can provide options 604 that include content items for which the data transformation and response system 100 can generate a generative response within an interface 602 of an application 600. In particular, the data transformation and response system 100 can use contextual information from the application, the client device, and/or other applications running parallel to the application 600 on the client device, to identify content items with which a user is likely to request a generative response. In some cases, the application 600 is an application of the content management system for providing generative responses for content items, and the options 604 correspond to content items of applications for which the data transformation and response system 100 and/or the content management system has established connectors or content items of applications where there is not an established connector. Indeed, the data transformation and response system 100 can display options 604 as representative options for establishing a connector.

As further shown in FIG. 6B, the data transformation and response system 100 can receive a user input 606 requesting a generative response corresponding to a content item of options 604. In particular, the data transformation and response system 100 compares the user input 606 to formatted local data stored in a local index to the user input 606 and utilizes a generative model to generate a generative response that corresponds to the user input 606. For example, as shown, the data transformation and response system 100 can receive user input 606 as a query corresponding to the content item of options 604, and the data transformation and response system 100 can compare the query to the formatted local data in the local index to generate a generative response.

As illustrated in FIG. 6C, the data transformation and response system 100 provides a generative response 608 that is synthesized from formatted local data with an indication that additional generative functions are available through establishing a connector with the application associated with the formatted local data (e.g., an email application). More specifically, the data transformation and response system 100 determines that the formatted local data in the local index comprises a portion of the data that would be available with a connector and generates the generative response 608 as a preview response that includes information within in the formatted local data. For example, the data transformation and response system 100 can determine that there is a limited amount of formatted local data available within the local index and determine to generate the preview response and the notification. As an illustration, the data transformation and response system 100 can determine that the formatted local data in the local index is limited to a certain time period or that there is a limited amount of formatted local data (e.g., one email) and provide the indication in generative response 608.

As shown in FIG. 6D, upon receiving a user input establishing a connector with the application, the data transformation and response system 100 can generate an updated generative response 610. More specifically, the data transformation and response system 100 receives a user interaction to generate the connector and generates the connector between the application and the content management system. Upon generating the connector, for example, the data transformation and response system 100 can utilize third-party data accessed through the connector to generate the updated generative response 610. As shown, by accessing (or receiving) the third-party data through the connector, the data transformation and response system 100 is able to generate the updated generative response 610 that includes details not available in the formatted local data, such as the additional details regarding the terms of the contract that are included in an email of the application.

As previously mentioned, the data transformation and response system transforms unstructured data from an application running locally on a client device to a data format of a connector for the application and indexes the data in a local index for use by a generative model. In particular, the data transformation and response system utilizes various devices, servers, and networks for storing, synchronizing, and communicating regarding content items. FIG. 7 illustrates a schematic diagram of an environment in which a data transformation and response system can operate in accordance with one or more embodiments.

As shown, the environment 700 includes server device(s) 702, database 706, client device(s) 714, and third-party server device(s) 708. Each of the components of the environment 700 can communicate via network 712, and network 712 may be any suitable network over which computing devices can communicate. Example networks are discussed in more detail in relation to FIGS. 9-10.

As mentioned above, the environment 700 includes client device(s) 714. The client device(s) 714 can be one of a variety of computing devices, including a smartphone, a tablet, a smart television, a desktop computer, a laptop computer, a virtual reality device, an augmented reality device, or another computing device as described in relation to FIGS. 9-10. The client device(s) 714 can communicate with the server device(s) 702 via network 712. For example, the client device(s) 714 can receive user input from a user interacting with client device(s) 714 (e.g., via the client application 716) to, for instance, receive user interactions with content items. In addition, the data transformation and response system or the server device(s) 702 can receive information relating to various interactions with content items and/or user interface elements based on the input received by the client device(s) 714.

As shown, the client device(s) 714 can include a client application 716 that is associated with the content management system 704 and/or the data transformation and response system 100. In particular, the client application 716 can be an application through which the content management system 704 and/or the data transformation and response system 100 can provide generative responses corresponding to the client device(s) 714. The client application 716 may be a web application, a native application installed on the client device(s) 714 (e.g., a mobile application, a desktop application, etc.), or a cloud-based application where all or part of the functionality is performed by the server device(s) 702. Based on instructions from the client application 716, the client device(s) 714 can present or display information, such as a user interface for interacting with various interface elements or displaying content items. Using the client application 716, the client device(s) 714 can perform (or request to perform) various operations, such as displaying a generative response.

As also shown, the client device(s) 714 can include third-party application(s) 718. More particularly, the third-party application(s) 718 can include an application that executes locally on the client device(s) 714, but the operational functionality of the third-party application(s) 718, along with any associated data or content, is provided, supported, or served by the third-party server device(s) 708. For example, the third-party application(s) 718 may be a web application, a native application installed on the client device(s) 714 (e.g., a mobile application, a desktop application, etc.), or a cloud-based application where all or part of the functionality is performed by the server device(s) 708. Based on instructions from the third-party application(s) 718, the client device(s) 714 can present or display information, including a user interface for interacting with interfaces, displaying content items, or displaying generative responses. Using the third-party application(s) 718, the client device(s) 714 can perform (or request to perform) various operations, such as displaying a generative response or an interface element within the third-party application(s) 718 for displaying the generative response and/or receiving input corresponding to the generative response.

Figure 7:
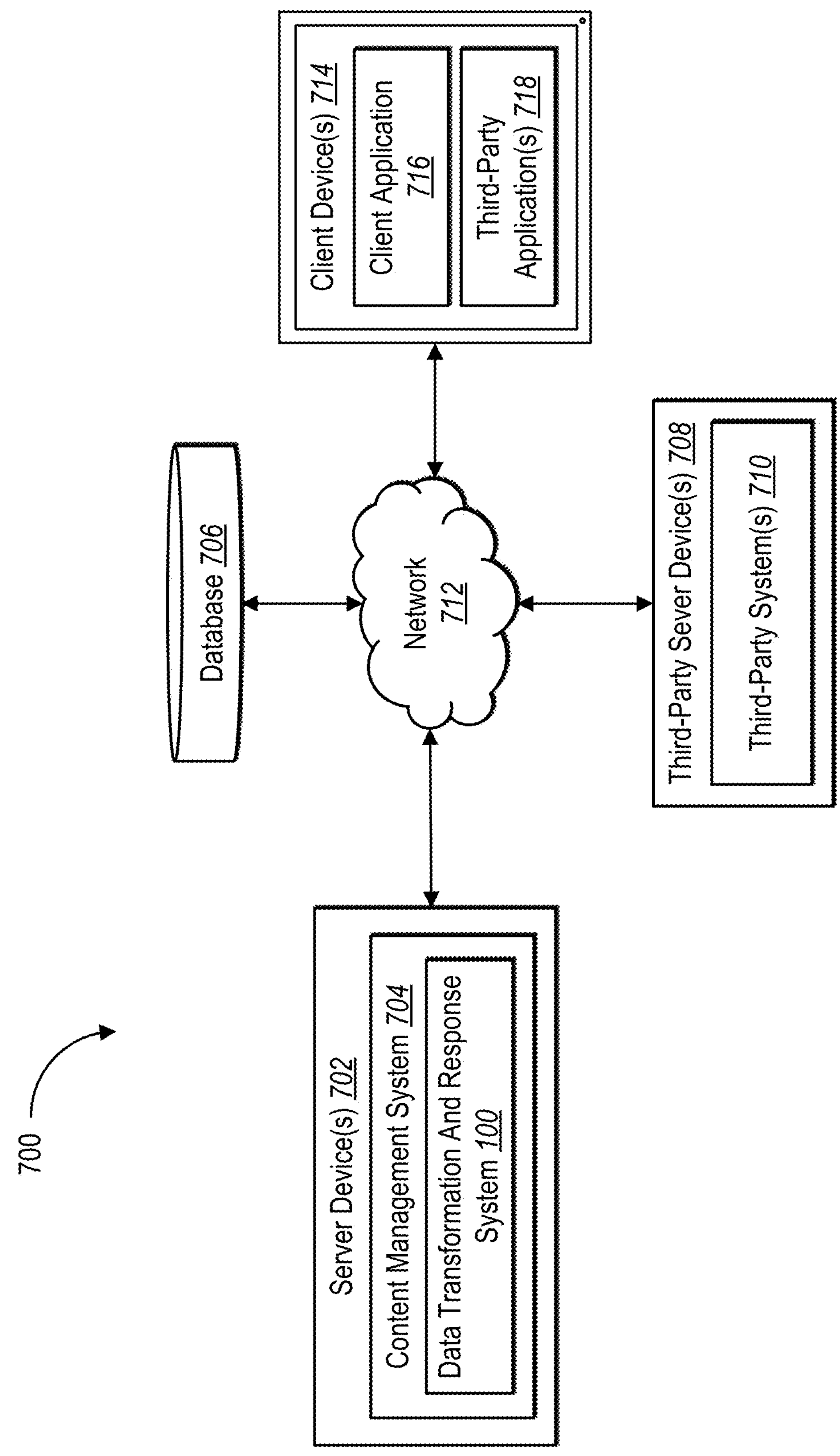
FIG. 7 illustrates a diagram of an environment in which a data transformation and response system can operate in accordance with one or more embodiments.

In addition, as shown in FIG. 7, the environment 700 includes the third-party server device(s) 708 that host the third-party system(s) 710. Specifically, the third-party server device(s) 708 can communicate with the client device(s) 714 and/or the server device(s) 702 to provide data corresponding to content items or the third-party application(s) 718. In some cases, the third-party server device(s) 708 have (or establish) a connector to the content management system 704 through which the content management system 704 can receive and provide data.

As illustrated in FIG. 7, the environment 700 also includes the server device(s) 702. The server device(s) 702 may generate, track, store, process, receive, and transmit electronic data, such as generative response, interface elements (e.g., windows), interactions with interface elements, and/or interactions between user accounts or client devices. For example, the server device(s) 702 may receive an indication from the client device(s) 714 of a user interaction with an interface element, screen capture data from the client device(s) 714, user input corresponding to a content item for a generative response, or other various interactions. In addition, the server device(s) 702 can transmit data to the client device(s) 714 in the form of a generative response or an interface element. Indeed, the server device(s) 702 can communicate with the client device(s) 714 to send and/or receive data via network 712. In some implementations, the server device(s) 702 comprise a distributed server where the server device(s) 702 include a number of server devices distributed across the network 712 and located in different physical locations. The server device(s) 702 can comprise one or more content servers, application servers, container orchestration servers, communication servers, web-hosting servers, machine learning servers, and other types of servers.

As shown in FIG. 7, the server device(s) 702 can also include the data transformation and response system as part of the content management system 704. The content management system 704 can communicate with the client device (s) 714 to perform various functions associated with the client application 716, such as managing user accounts, identifying content items, and storing formatted local data. Indeed, content management system 704 can include a network-based smart cloud storage system to manage, store, and maintain content items, formatted local data, and related data across numerous user accounts and corresponding to various client device(s) associated with a user account. In some embodiments, the data transformation and response system and/or the content management system 704 utilize the database 706 to store and access information, such as content items, and/or to act as a local index for formatted local data.

Although FIG. 7 depicts the data transformation and response system located on the server device(s) 702, in some implementations, the data transformation and response system may be implemented by (e.g., located entirely or in part on) one or more other components of the environment. For example, the data transformation and response system may be implemented as part of client device(s) 714 and/or a third-party system. As another example, the client device(s) 714 and/or a third-party system can download all or part of the data transformation and response system for implementation independent of, or together with, the server device(s) 702.

In some implementations, though not illustrated in FIG. 7, the environment 700 may have a different arrangement of components and/or may have a different number or set of components altogether. For example, the client device(s) 714 may communicate directly with the data transformation and response system, bypassing network 712. The environment 700 may also include one or more third-party systems, each corresponding to a different data source. In addition, the environment 700 can include the database 706 located external to the server device(s) 702 (e.g., in communication via the network 712) or located on the server device(s) 702 and/or on the client device(s) 714.

Figure 8:
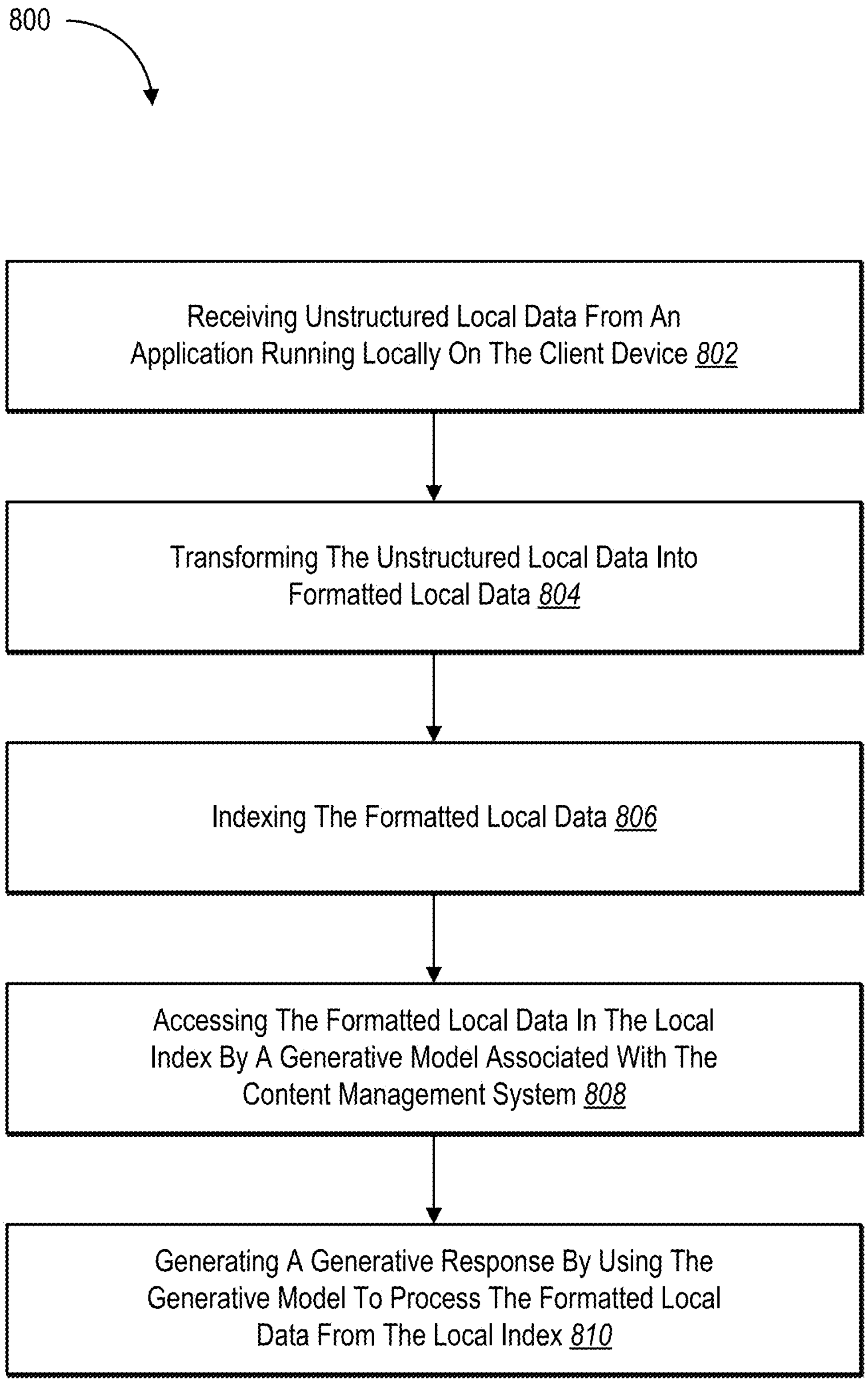
FIG. 8 illustrates a flowchart of a series of acts for transforming unstructured local data into formatted local data and using the formatted local data to generate a generative response in accordance with one or more embodiments.

FIGS. 1-7, the corresponding text, and the examples provide a number of different methods, systems, devices, and non-transitory computer-readable media of the data transformation and response system. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for transforming unstructured data from an application running locally on a client device to a data format of a connector for the application and indexing the data in a local index for use by a generative model in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 802 of receiving unstructured local data from an application running locally on the client device, an act 804 of transforming the unstructured local data into formatted local data, an act 806 of indexing the formatted local data, an act 808 of accessing the formatted local data in the local index by a generative model associated with the content management system, and an act 810 of generating a generative response by using the generative model to process the formatted local data from the local index.

In particular, the act 802 can include receiving, from a client device associated with a content management system, unstructured local data from an application running locally on the client device, the act 804 can include transforming the unstructured local data into formatted local data by applying a data format compatible with a connector corresponding to the application, the act 806 can include indexing the formatted local data in a local index associated with the client device, the act 808 can include accessing the formatted local data in the local index by a generative model associated with the content management system, and the act 810 can include generating, for display on the client device, a generative response by using the generative model to process the formatted local data from the local index.

For example, the series of acts 800 can include acts to perform any of the operations described in the following clauses:

CLAUSE 1. A computer-implemented method comprising receiving, from a client device associated with a content management system, unstructured local data from an application running locally on the client device, transforming the unstructured local data into formatted local data by applying a data format compatible with a connector corresponding to the application, indexing the formatted local data in a local index associated with the client device, accessing the formatted local data in the local index by a generative model associated with the content management system, and generating, for display on the client device, a generative response by using the generative model to process the formatted local data from the local index.

CLAUSE 2. The computer-implemented method of clause 1, wherein indexing the formatted local data in a local index associated with the client device further comprises generating interaction metadata corresponding to user interactions with the application and indexing the interaction metadata with the formatted local data in the local index.

CLAUSE 3. The computer-implemented method of clauses 1-2, further comprising generating the generative response based on a user input corresponding to the application running locally on the client device and providing the generative response within the application running locally on the client device.

CLAUSE 4. The computer-implemented method of clauses 1-3, further comprising generating the generative response based on detecting the application running locally on the client device and further based on a user input within a separate application of the content management system running parallelly with the application on the client device and providing the generative response within the separate application of the content management system.

CLAUSE 5. The computer-implemented method of clauses 1-4, wherein receiving the unstructured local data comprises receiving a data segment corresponding to a portion of a content item associated with the application and generating the generative response comprises using the generative model to generate a preview response that represents the data segment corresponding to the content item.

CLAUSE 6. The computer-implemented method of clauses 1-5, further comprising providing, for display on the client device, a notification that additional generative functions are available by establishing a connector between the content management system and the application running locally on the client device.

CLAUSE 7. The computer-implemented method of clauses 1-6, further comprising extracting screen capture metadata indicating content rendered within the application running locally on the client device and generating the generative response by using the generative model to process the screen capture metadata together with the formatted local data.

CLAUSE 8. A non-transitory computer-readable medium storing instructions that, when executed by at least one processor, cause a computer system to receive, from a client device associated with a content management system, unstructured local data from a third-party application running locally on the client device, determine a data format for a connector corresponding to the third-party application running locally on the client device, transform the unstructured local data into formatted local data by applying the data format for the connector, index the formatted local data in a local index associated with the client device, access the formatted local data in the local index by a generative model associated with the content management system, and generate, for display on the client device, a generative response by using the generative model to process the formatted local data from the local index.

CLAUSE 9. The non-transitory computer-readable medium of clause 8, further comprising instructions that, when executed by the at least one processor, cause the computer system to generate a connector linking the content management system with the third-party application, in response to generating the connector, receive formatted third-party data through the connector corresponding to the third-party application, and merge the formatted local data with the formatted third-party data corresponding to the third-party application.

CLAUSE 10 The non-transitory computer-readable medium of clauses 8-9, further comprising instructions that, when executed by the at least one processor, cause the computer system to receive the unstructured local data by receiving a portion of unstructured data corresponding to a content item of the third-party application and generate the generative response by using the generative model to generate a preview response corresponding to the portion of the unstructured data corresponding to the content item.

CLAUSE 11. The non-transitory computer-readable medium of clauses 8-10, further comprising instructions that, when executed by the at least one processor, cause the computer system to provide, for display on the client device, a notification that additional generative functions are available by establishing a connector between the content management system and the third-party application running locally on the client device and generate the connector based on receiving a user interaction with an option to connect the third-party application to the content management system.

CLAUSE 12. The non-transitory computer-readable medium of clauses 8-11, further comprising instructions that, when executed by the at least one processor, cause the computer system to extracting screen capture metadata corresponding to content displayed within the third-party application and generate the generative response by using the generative model to process the screen capture metadata together with the formatted local data.

CLAUSE 13. The non-transitory computer-readable medium of clauses 8-12, further comprising instructions that, when executed by the at least one processor, cause the computer system to determine an entry point to connect the third-party application to the content management system and generate the generative response based on the entry point to connect the third-party application to the content management system.

CLAUSE 14. A system comprising at least one processor and at least one non-transitory computer-readable storage medium storing instructions that, when executed by the at least one processor, cause the system to receive, from a client device associated with a content management system, unstructured local data from an application running locally on the client device, transform the unstructured local data into formatted local data by applying a data format compatible with a connector maintained by the content management system for establishing persistent data transfer from the application, identify the formatted local data indexed in a local index associated with the client device, access the formatted local data in the local index by a generative model associated with the content management system, and generate, for display on the client device, a generative response by using the generative model to process the formatted local data from the local index.

CLAUSE 15. The system of clause 14, further comprising instructions that, when executed by the at least one processor, cause the system to extract screen capture metadata indicating content rendered within a user interface on the client device and generate the generative response by using the generative model to process the screen capture metadata together with the formatted local data.

CLAUSE 16. The system of clauses 14-15, further comprising instructions that, when executed by the at least one processor, cause the system to extract user interaction data corresponding to user interactions within a user interface on the client device and generate the generative response by using the generative model to process the user interaction data together with the formatted local data.

CLAUSE 17. The system of clauses 14-16, further comprising instructions that, when executed by the at least one processor, cause the system to provide the formatted local data from the local index to a local generative model on the client device to generate the generative response.

CLAUSE 18. The system of clauses 14-17, further comprising instructions that, when executed by the at least one processor, cause the system to relocate additional formatted local data from the local index associated with the client device to a secondary index associated with the content management system and generate the generative response by using the generative model to process the additional formatted local data from the secondary index.

CLAUSE 19. The system of clauses 14-18, further comprising instructions that, when executed by the at least one processor, cause the system to extract search query data corresponding to search queries submitted through the client device and generate the generative response by using the generative model to process the search query data together with the formatted local data.

CLAUSE 20. The system of clauses 14-19, further comprising instructions that, when executed by the at least one processor, cause the system to index the formatted local data in the local index by generating relevance features for the formatted local data and indexing the formatted local data in a prioritized local index according to the relevance features.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
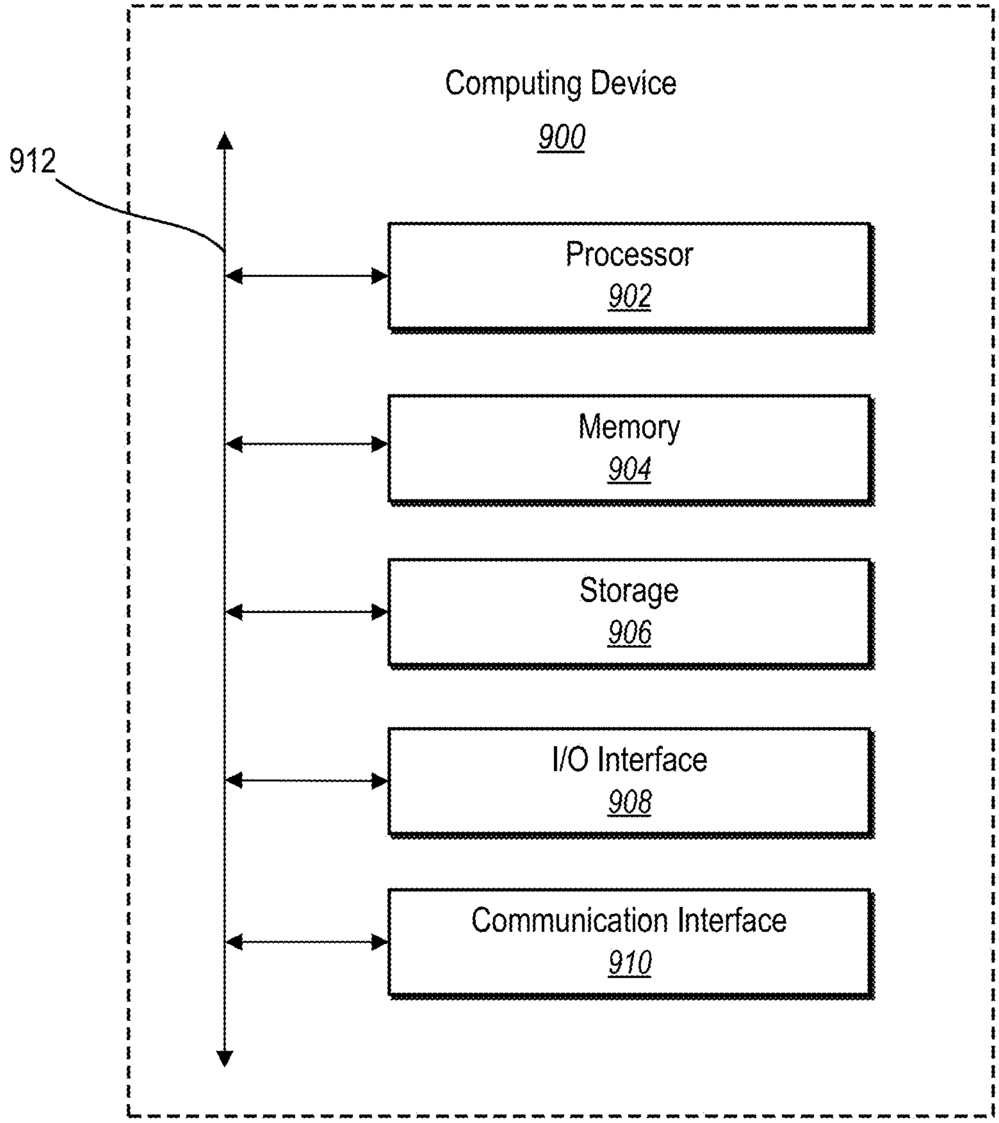
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., server device(s) 702, database 706, client device (s) 714, and third-party server device(s) 708) In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

Figure 10:
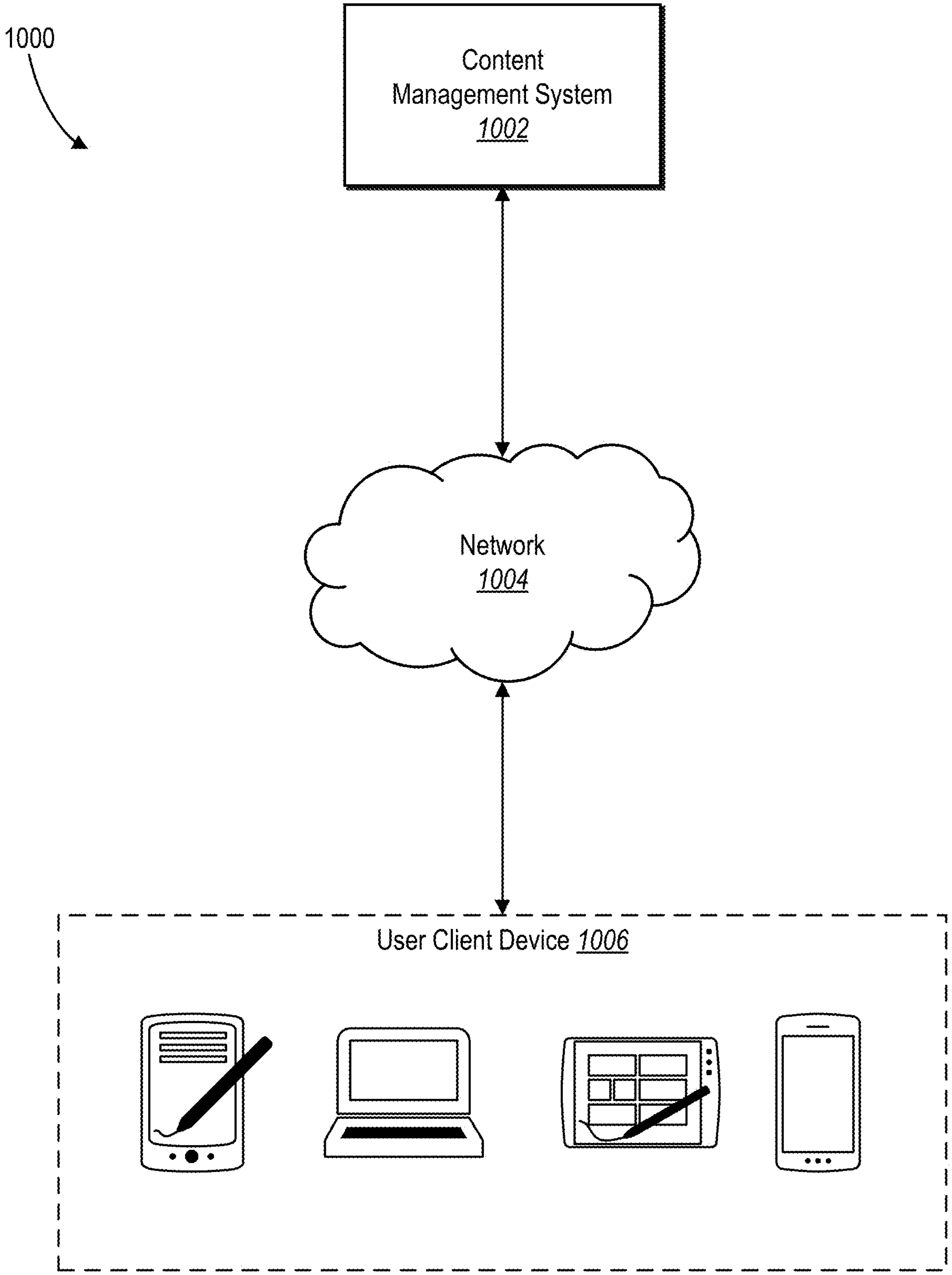
FIG. 10 illustrates an example environment for a content management system in accordance with one or more embodiments.

FIG. 10 is a schematic diagram illustrating environment 1000 within which one or more implementations of the data transformation and response system 100 can be implemented. For example, as previously described, the data transformation and response system 100 may be part of a content management system 1002 (e.g., the content management system 1002). Content management system 1002 may generate, store, manage, receive, and send digital content (such as digital content items). For example, content management system 1002 may send and receive digital content to and from the user client device 1006 by way of network 1004. In particular, content management system 1002 can store and manage a collection of digital content. Content management system 1002 can manage the sharing of digital content between computing devices associated with a plurality of users. For instance, content management system 1002 can facilitate a user sharing a digital content with another user of content management system 1002.

In particular, content management system 1002 can manage synchronizing digital content across multiple of the user client device 1006 associated with one or more users. For example, a user may edit digital content using the user client device 1006. The content management system 1002 can cause the user client device 1006 to send the edited digital content to content management system 1002. Content management system 1002 then synchronizes the edited digital content on one or more additional computing devices.

In addition to synchronizing digital content across multiple devices, one or more implementations of content management system 1002 can provide an efficient storage option for users that have large collections of digital content. For example, content management system 1002 can store a collection of digital content on content management system 1002, while the user client device 1006 only stores reduced-sized versions of the digital content. A user can navigate and browse the reduced-sized versions (e.g., a thumbnail of a digital image) of the digital content on user client device 1006. In particular, one way in which a user can experience digital content is to browse the reduced-sized versions of the digital content on user client device 1006.

Another way in which a user can experience digital content is to select a reduced-size version of digital content to request the full- or high-resolution version of digital content from content management system 1002. In particular, upon a user selecting a reduced-sized version of digital content, user client device 1006 sends a request to content management system 1002 requesting the digital content associated with the reduced-sized version of the digital content. Content management system 1002 can respond to the request by sending the digital content to user client device 1006. User client device 1006, upon receiving the digital content, can then present the digital content to the user. In this way, a user can have access to large collections of digital content while minimizing the number of resources used on user client device 1006.

User client device 1006 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the user client device 1006 may access content management system 1002.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, from a client device associated with a content management system, unstructured local data from an application running locally on the client device;

transforming the unstructured local data into formatted local data by applying a data format compatible with a connector corresponding to the application;

indexing the formatted local data in a local index associated with the client device;

accessing the formatted local data in the local index by a generative model associated with the content management system; and based on an application state for the application running locally on the client device, generating, for display on the client device, a generative response by using the generative model to process the formatted local data from the local index selected based on the application state.

2. The computer-implemented method of claim 1, wherein indexing the formatted local data in a local index associated with the client device further comprises:

generating interaction metadata corresponding to user interactions with the application; and indexing the interaction metadata with the formatted local data in the local index.

3. The computer-implemented method of claim 1, further comprising:

generating the generative response based on a user input corresponding to the application running locally on the client device; and providing the generative response within the application running locally on the client device.

4. The computer-implemented method of claim 1, further comprising:

generating the generative response based on a user input within a separate application of the content management system running parallelly with the application running locally on the client device; and providing the generative response within the separate application of the content management system.

5. The computer-implemented method of claim 1, wherein:

receiving the unstructured local data comprises receiving a data segment corresponding to a portion of a content item associated with the application; and generating the generative response comprises using the generative model to generate a preview response that represents the data segment corresponding to the content item.

6. The computer-implemented method of claim 1, further comprising providing, for display on the client device, a notification that additional generative functions are available by establishing a connector between the content management system and the application running locally on the client device.

7. The computer-implemented method of claim 1, further comprising:

extracting screen capture metadata indicating content rendered within the application running locally on the client device; and generating the generative response by using the generative model to process the screen capture metadata together with the formatted local data.

8. A non-transitory computer-readable medium storing instructions that, when executed by at least one processor, cause a computer system to:

receive, from a client device associated with a content management system, unstructured local data from a third-party application running locally on the client device;

determine a data format for a connector corresponding to the third-party application running locally on the client device;

transform the unstructured local data into formatted local data by applying the data format for the connector;

index the formatted local data in a local index associated with the client device;

access the formatted local data in the local index by a generative model associated with the content management system; and based on an application state for the third-party application running locally on the client device, generate, for display on the client device, a generative response by using the generative model to process the formatted local data from the local index selected based on the application state.

9. The non-transitory computer-readable medium of claim 8, further comprising instructions that, when executed by the at least one processor, cause the computer system to:

generate a connector linking the content management system with the third-party application;

in response to generating the connector, receive formatted third-party data through the connector corresponding to the third-party application; and merge the formatted local data with the formatted third-party data corresponding to the third-party application.

10. The non-transitory computer-readable medium of claim 8, further comprising instructions that, when executed by the at least one processor, cause the computer system to:

receive the unstructured local data by receiving a portion of unstructured data corresponding to a content item of the third-party application; and generate the generative response by using the generative model to generate a preview response corresponding to the portion of the unstructured data corresponding to the content item.

11. The non-transitory computer-readable medium of claim 10, further comprising instructions that, when executed by the at least one processor, cause the computer system to:

provide, for display on the client device, a notification that additional generative functions are available by establishing a connector between the content management system and the third-party application running locally on the client device; and generate the connector based on receiving a user interaction with an option to connect the third-party application to the content management system.

12. The non-transitory computer-readable medium of claim 8, further comprising instructions that, when executed by the at least one processor, cause the computer system to:

extract screen capture metadata corresponding to content displayed within the third-party application; and generate the generative response by using the generative model to process the screen capture metadata together with the formatted local data.

13. The non-transitory computer-readable medium of claim 8, further comprising instructions that, when executed by the at least one processor, cause the computer system to:

determine an entry point to connect the third-party application to the content management system; and generate the generative response based on the entry point to connect the third-party application to the content management system.

14. A system comprising:

at least one processor; and at least one non-transitory computer-readable storage medium storing instructions that, when executed by the at least one processor, cause the system to:

receive, from a client device associated with a content management system, unstructured local data from an application running locally on the client device;

transform the unstructured local data into formatted local data by applying a data format compatible with a connector maintained by the content management system for establishing persistent data transfer from the application;

identify the formatted local data indexed in a local index associated with the client device;

access the formatted local data in the local index by a generative model associated with the content management system; and based on an application state for the application running locally on the client device, generate, for display on the client device, a generative response by using the generative model to process the formatted local data from the local index selected based on the application state.

15. The system of claim 14, further comprising instructions that, when executed by the at least one processor, cause the system to:

extract screen capture metadata indicating content rendered within a user interface on the client device; and generate the generative response by using the generative model to process the screen capture metadata together with the formatted local data.

16. The system of claim 14, further comprising instructions that, when executed by the at least one processor, cause the system to:

extract user interaction data corresponding to user interactions within a user interface on the client device; and generate the generative response by using the generative model to process the user interaction data together with the formatted local data.

17. The system of claim 14, further comprising instructions that, when executed by the at least one processor, cause the system to provide the formatted local data from the local index to a local generative model on the client device to generate the generative response.

18. The system of claim 14, further comprising instructions that, when executed by the at least one processor, cause the system to:

relocate additional formatted local data from the local index associated with the client device to a secondary index associated with the content management system; and generate the generative response by using the generative model to process the additional formatted local data from the secondary index.

19. The system of claim 14, further comprising instructions that, when executed by the at least one processor, cause the system to:

extract search query data corresponding to search queries submitted through the client device; and generate the generative response by using the generative model to process the search query data together with the formatted local data.

20. The system of claim 14, further comprising instructions that, when executed by the at least one processor, cause the system to index the formatted local data in the local index by:

generating relevance features for the formatted local data; and indexing the formatted local data in a prioritized local index according to the relevance features.

* * * * *